US012717599B1

(12) United States Patent
Saleiro et al.

(10) Patent No.: US 12,717,599 B1
(45) Date of Patent: Aug. 25, 2026

(54) TEACHING COMPUTER-USE ARTIFICIAL INTELLIGENCE (AI) AGENTS FROM VIDEO DEMONSTRATION

(71) Applicant: OPNOVA, Inc., Woodside, CA (US)

(72) Inventors: Pedro dos Santos Saleiro, Oporto (PT); Sinan Eren, Woodside, CA (US); Vladimir Balayan, Santa Maria da Feira (PT); Jose Luis Ferras Pereira, Marco de Canaveses (PT); Tiago Altino de Andrade e Melo, Marco de Canaveses (PT)

(73) Assignee: OPNOVA, Inc., Woodside, CA (US)

( * ) Notice: Subject to any disclaimer, the term of this patent is extended or adjusted under 35 U.S.C. 154(b) by 0 days.

(21) Appl. No.: 19/430,838

(22) Filed: Dec. 23, 2025

Related U.S. Application Data

(60) Provisional application No. 63/796,231, filed on Apr. 28, 2025.

(51) Int. Cl.

| | |
|---|---|
| ***G06F 9/451*** | (2018.01) |
| ***G06F 40/103*** | (2020.01) |
| ***G06F 40/40*** | (2020.01) |
| ***G06V 20/40*** | (2022.01) |

(52) U.S. Cl.
CPC ............ *G06F 9/453* (2018.02); *G06F 40/103* (2020.01); *G06F 40/40* (2020.01); *G06V 20/44* (2022.01); *G06V 20/46* (2022.01); *G06V 20/48* (2022.01)

(58) Field of Classification Search
CPC ........ G06F 9/453; G06F 40/103; G06F 40/40; G06V 20/46; G06V 20/44; G06V 20/48
See application file for complete search history.

(56) References Cited

U.S. PATENT DOCUMENTS

| | | | |
|---|---|---|---|
| 12,287,728 B1 * | 4/2025 | Spencer-Harper | G06F 11/3684 |
| 2009/0083710 A1 * | 3/2009 | Best | G06F 9/453 717/120 |
| 2017/0001308 A1 * | 1/2017 | Bataller | B25J 9/1679 |
| 2020/0068265 A1 * | 2/2020 | Pinel | H04N 21/4882 |
| 2025/0036555 A1 * | 1/2025 | Brar | G06F 11/3688 |
| 2025/0045327 A1 * | 2/2025 | Avram | G06F 9/453 |
| 2025/0298495 A1 * | 9/2025 | Bavishi | G06V 10/774 |

* cited by examiner

*Primary Examiner* — Daniel Samwel
(74) *Attorney, Agent, or Firm* — Van Pelt, Yi & James LLP

(57) ABSTRACT

In various embodiments, a process for teaching computer-use artificial intelligence agents includes receiving a task recording including video information that captures a multi-step interaction with a user interface and associated device input information. A sequence of anchor actions is extracted from the video information. For each anchor action, a preceding frame and a following frame are obtained adjacent to the anchor action. A prompt including a task prompt in natural language that describes the interaction based on the anchor actions and frames is generated. The task prompt includes computer-executable instructions to replicate the interaction. The prompt is executed to obtain an execution trace including predicted actions. The predicted actions are compared with the anchor actions to identify whether there is a discrepancy between the predicted and anchor actions. If there is a discrepancy, the prompt is iteratively enhanced until there is no discrepancy. The (enhanced, if applicable) prompt is output.

43 Claims, 14 Drawing Sheets

TEACHING COMPUTER-USE ARTIFICIAL INTELLIGENCE (AI) AGENTS FROM VIDEO DEMONSTRATION

CROSS REFERENCE TO OTHER APPLICATIONS

This application claims priority to U.S. Provisional Patent Application No. 63/796,231 entitled TEACHING COMPUTER-USE ARTIFICIAL INTELLIGENCE (AI) AGENTS FROM VIDEO DEMONSTRATION filed Apr. 28, 2025 which is incorporated herein by reference for all purposes.

BACKGROUND OF THE INVENTION

The advent of computer automation has improved the workflow and completion of processes that would otherwise be difficult or time-consuming without the use of computers. However, many aspects of task completion remain manual and can be tedious or monotonous. Additionally, the use of computers for functions such as record keeping or data entry has led to the rise of new repetitive tasks or "reworking." Conventional task automation such as robotic process automation (RPA) typically requires substantial domain knowledge or professional expertise. Additionally, RPA is typically rigid and not easily adapted for individual preferences or changes in a computing environment. Thus, there is a need for computer-implementation technologies that minimize rework, do not require specialized domain knowledge or expertise, and facilitate process mining.

BRIEF DESCRIPTION OF THE DRAWINGS

Various embodiments of the invention are disclosed in the following detailed description and the accompanying drawings.

DETAILED DESCRIPTION

Figure 1:
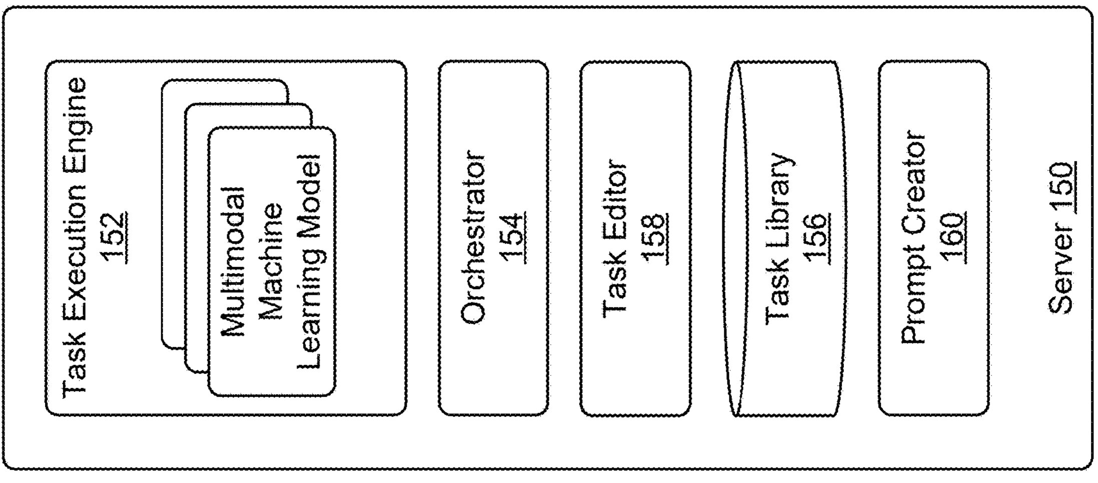
FIG. 1 is a functional diagram illustrating an embodiment of a system for teaching computer-use artificial intelligence agents from video demonstration.
Figure 1:
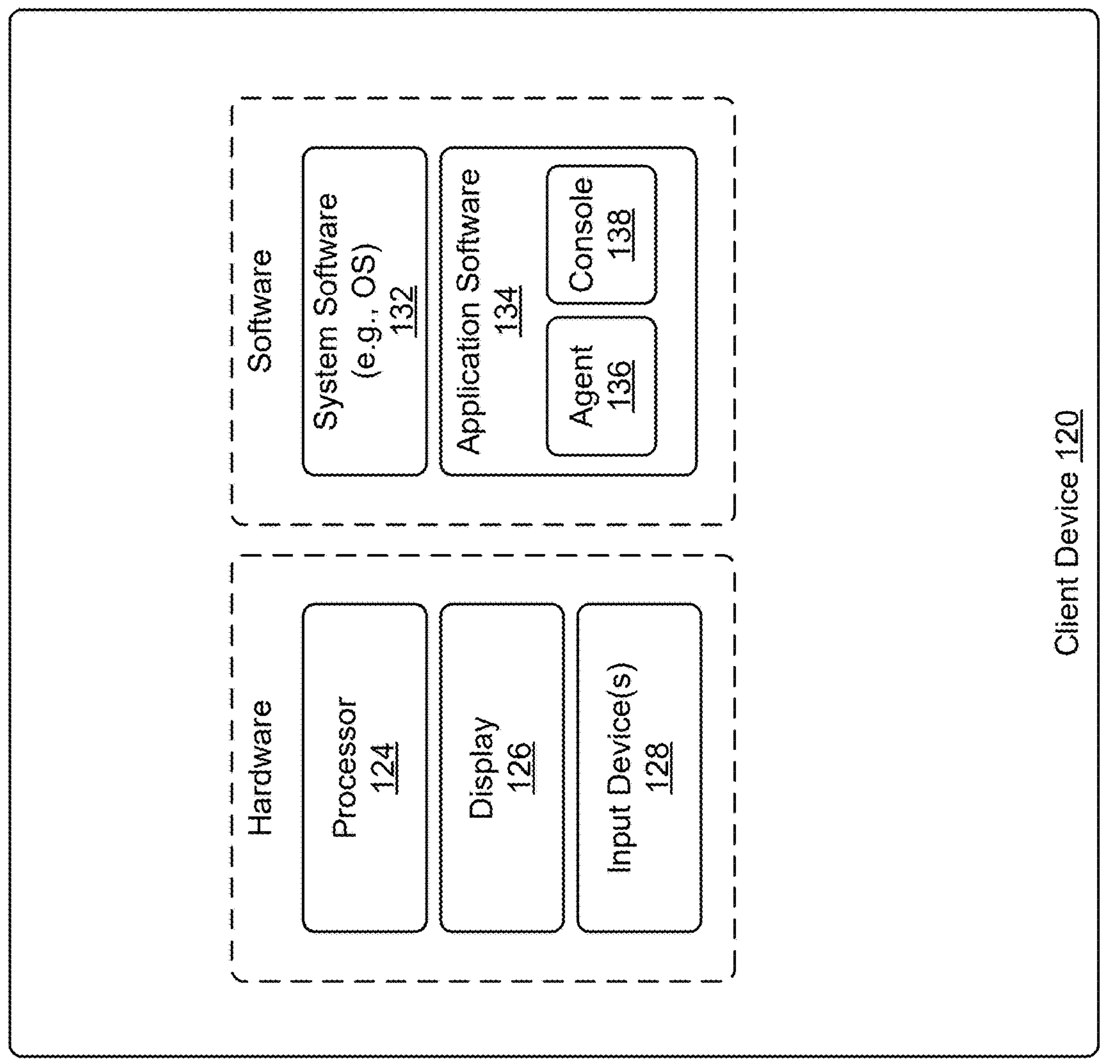

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Process or workflow automation may make use of agentic AI to take the rework out of work. A "computer-use agent" refers to an automated software system that is designed to interact with and control a computer's operating system and applications to perform tasks that would otherwise be performed by a human user or be incapable of being performed accurately or efficiently by a human user. The computer-use agent interprets instructions (which may be in the form of natural language prompts), perceives the computer's state (through mechanisms such as screen captures and system metadata), and executes actions (such as mouse movements, clicks, keyboard inputs, or API calls) to accomplish defined objectives. Computer-use agents may incorporate artificial intelligence (AI) such as large language models and computer vision capabilities, to understand context, adapt to changing environments, and make decisions about the appropriate actions to take in response to the current state of the computer system.

In various embodiments, a computer-use agent is installed on the computer that controls the operating system (OS) to perform low-level actions such as clicking on a coordinate, dragging a mouse, hotkeys, shortcuts, etc. that can be applied to open-ended prompts such as "open a browser and search for a hotel in Palo Alto" or specific steps such as IT setup for onboarding a new employee. Advantages over existing technologies include, among other things: (1) flexibility to adapt to changes in browser/app content, e.g., if a start button is clicked as part of a workflow and the button's appearance changes, the agentic AI knows to click the button regardless of the button's changing looks, (2) ability to include constraints/(complex) logic such as how to execute work such as guidelines of how to handle edge cases, how to reference data, how to implement security policies, or what to do when an unexpected state is observed (3) agent can run on end user's computer and does not require custom hardware and isn't limited to specific software—the agent isn't limited to being operated by a domain expert, (4) distributed architecture unlike existing technologies that use generative AI for their existing technology and run on a dedicated machine, and (5) automatically generating task prompts to facilitate the completion and automation of tasks. Therefore, the disclosed techniques improve the functioning of computers used for minimizing rework and also improve the technical field of computer automation by using fewer computing resources to more efficiently automate tasks.

Techniques for teaching computer-use artificial intelligence agents from video demonstration are disclosed. A task recording capturing a multi-step interaction with a computer user interface, along with associated device input information, is processed to extract a sequence of anchor actions. The anchor actions are translated into a natural language task prompt describing the complete workflow. A meta-prompting reinforcement learning loop validates the prompt by comparing an AI agent's execution trace against ground truth actions derived from the recording. When discrepancies are detected at any step, the system iteratively refines the prompt until the agent's actions match the demonstrated task across all steps. The validated natural language prompt enables automated replication of the recorded workflow without requiring programming expertise In various embodiments, computer-use agent task prompts are automatically generated from video recordings of human demonstrations. A recording mechanism captures a user's interactions with a computer system, including video frames, mouse actions, keyboard inputs, and, optionally, voice annotations. The system aligns these inputs on a timeline and extracts meaningful actions that modify the computer state. By identifying "before" and "after" states associated with each significant action, the system can generate a sequence of steps that represent the demonstrated workflow.

Unlike conventional techniques, the disclosed techniques include a meta-prompting reinforcement learning loop that optimizes the generated prompts. In various embodiments, the system uses ground truth actions extracted from the video recording to evaluate and iteratively improve the prompts through a feedback mechanism. This ensures that the final prompts reliably reproduce the intended actions when executed by a computer-use agent.

Figure 2:
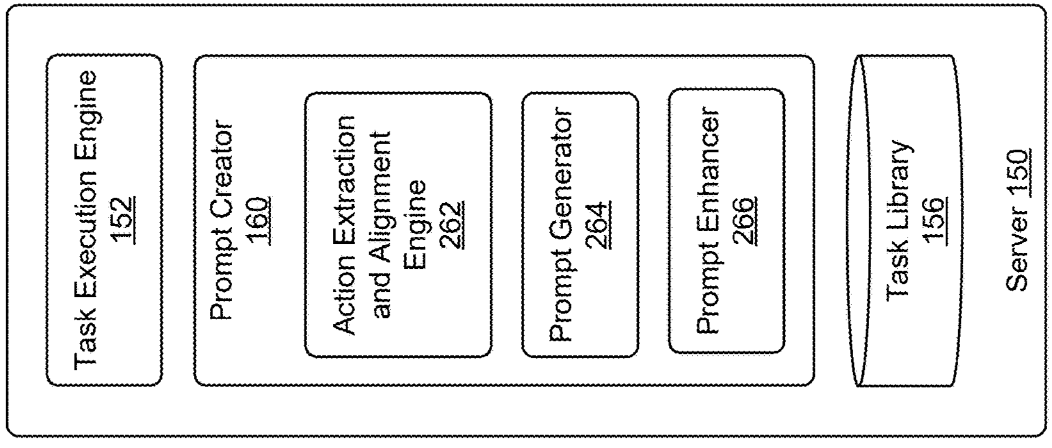
FIG. 2 is a functional diagram illustrating an embodiment of a distributed system for teaching computer-use artificial intelligence agents from video demonstration.
Figure 2:
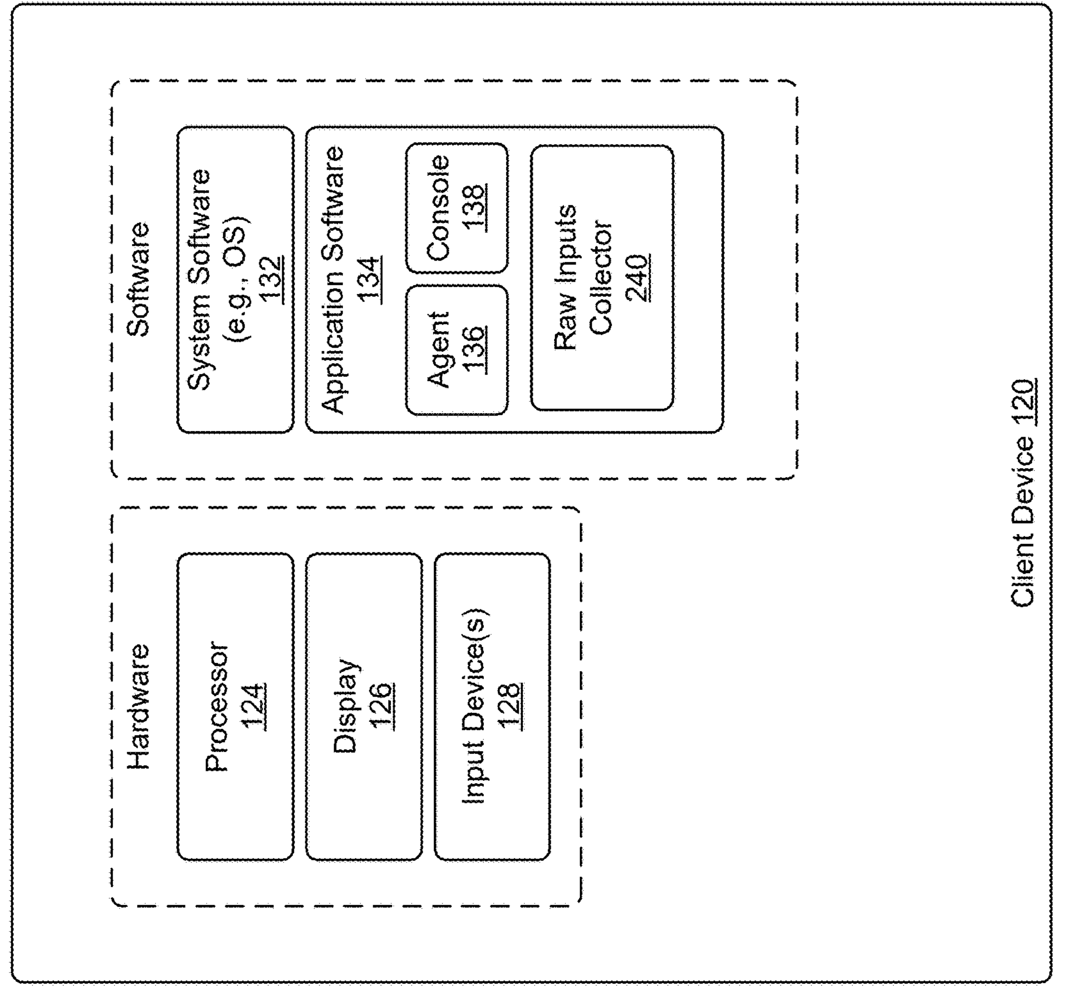
Figure 3:
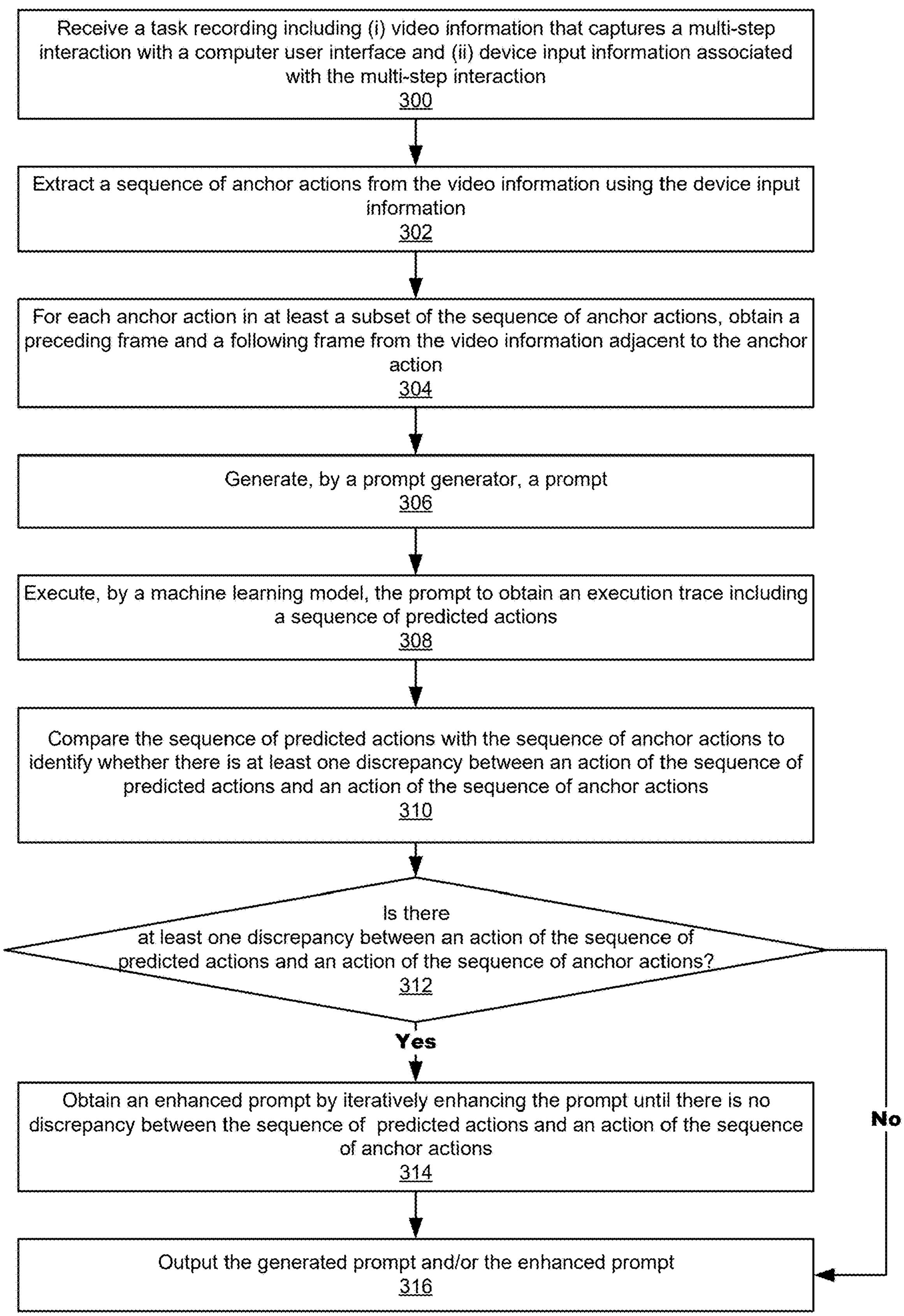
FIG. 3 is a flow diagram illustrating an embodiment of a process for teaching computer-use artificial intelligence agents from video demonstration.
Figure 4:
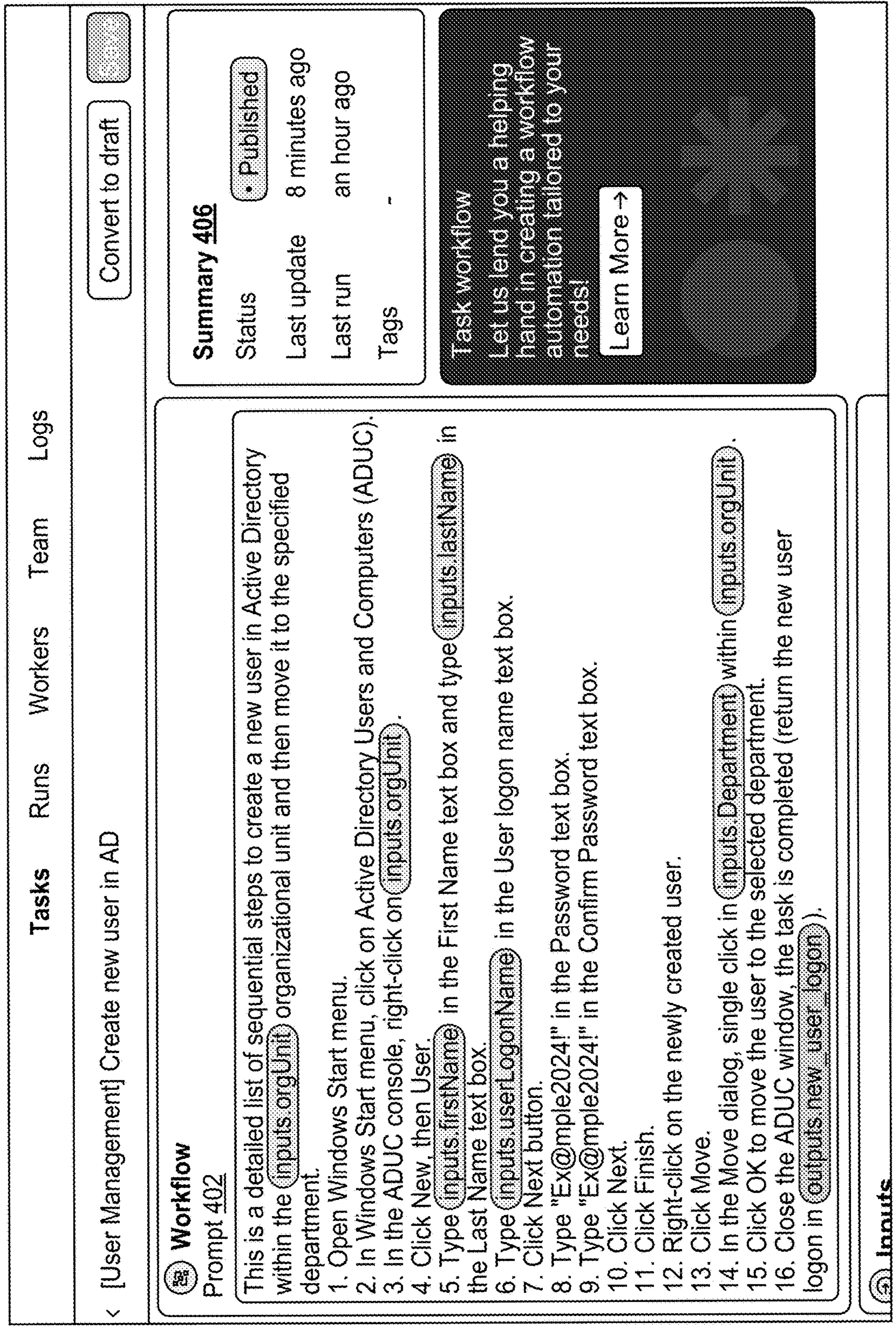
FIG. 4 is a diagram illustrating an example of a graphical user interface for displaying a task prompt associated with a task to create a new user in an active directory (AD).
Figure 7:
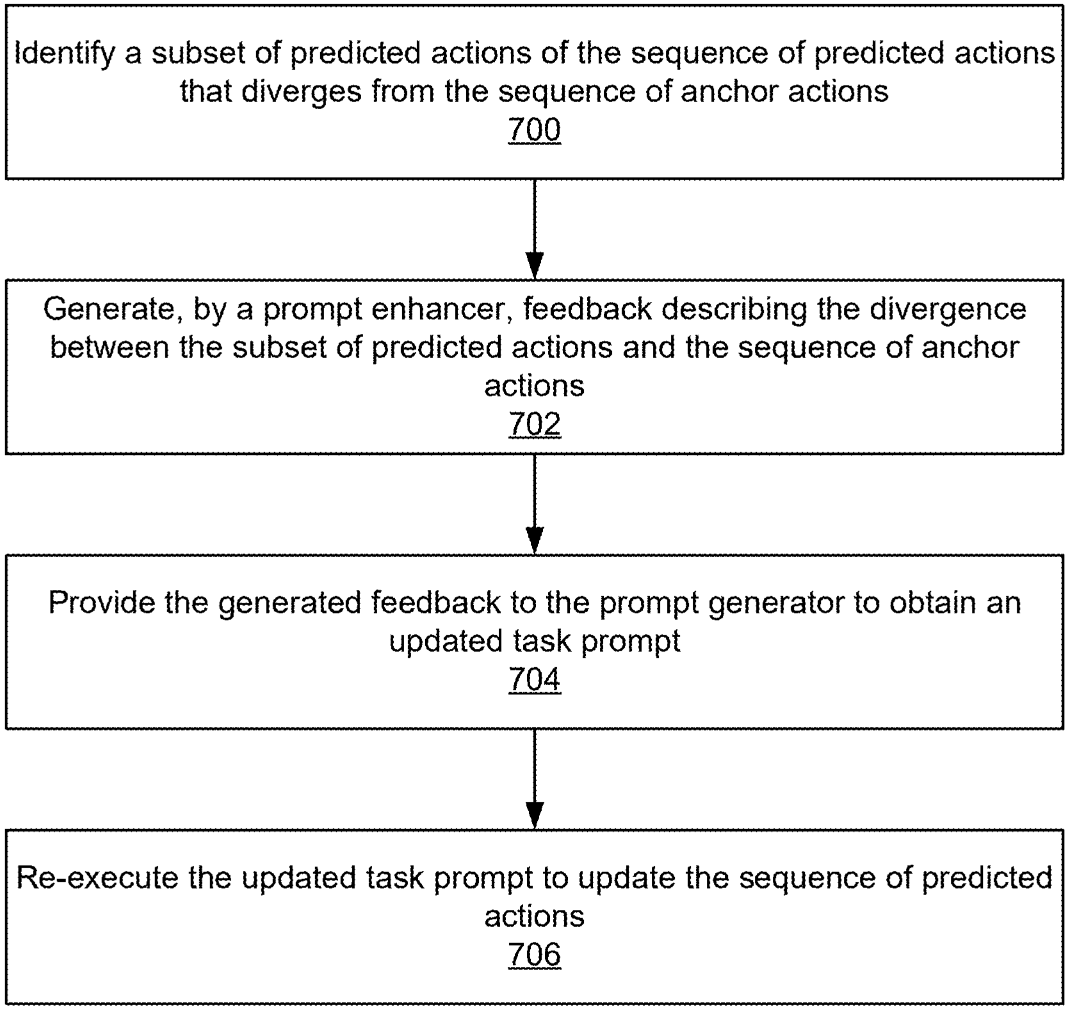
FIG. 7 is a flow diagram illustrating an embodiment of a process for enhancing a machine learning model output to obtain an enhanced prompt.
Figure 8:
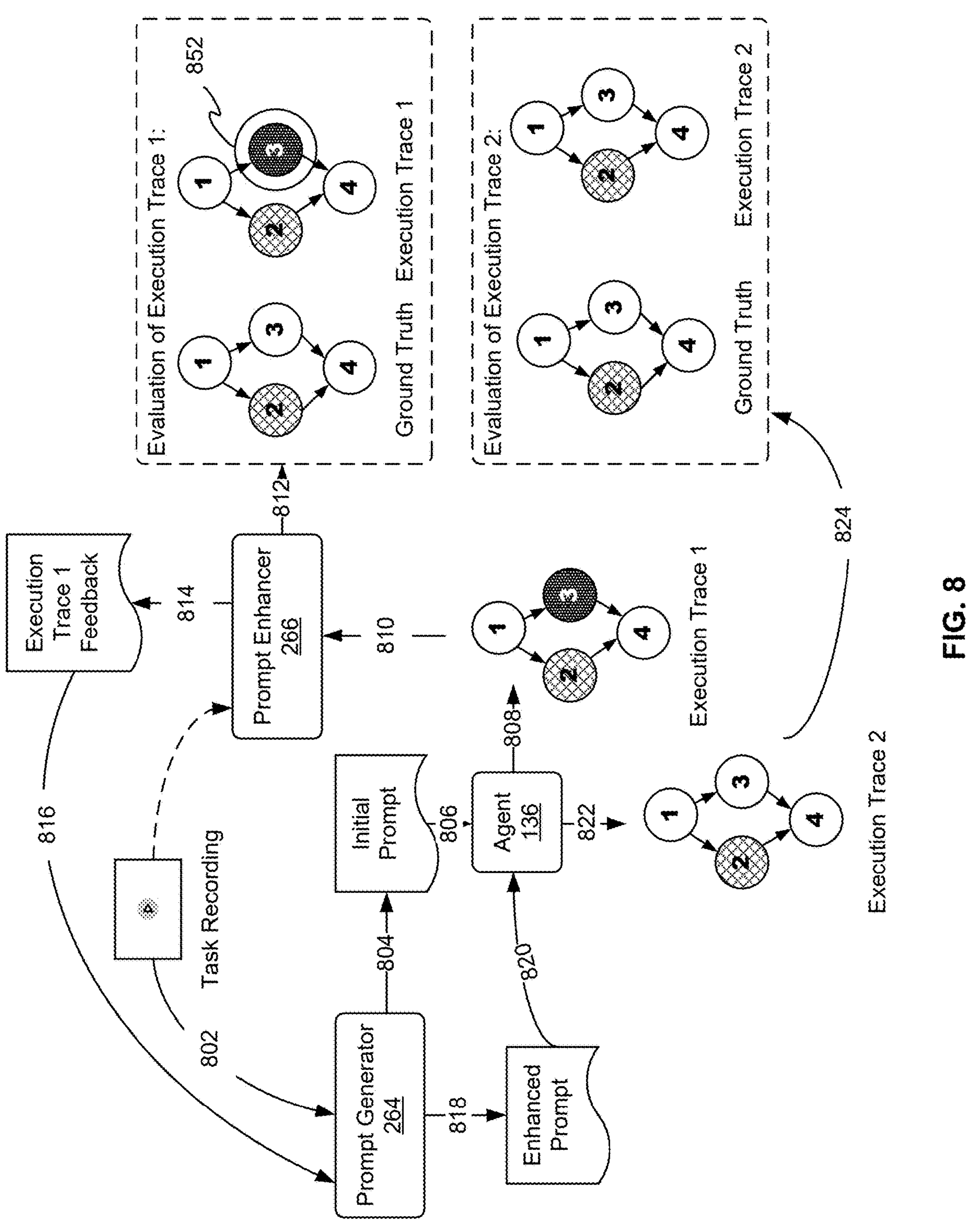
FIG. 8 is a conceptual diagram illustrating enhancing a machine learning model output to obtain an enhanced prompt.

First, a system for teaching computer-use artificial intelligence agents from video demonstration is described (FIGS. 1 and 2). Next, a process for teaching computer-use artificial intelligence agents from video demonstration is described (FIG. 3). Then, an example of a prompt generated using the disclosed techniques is described (FIG. 4). Next, a process for extracting an anchor action is described (FIGS. 5 and 6A-6D). Then, an example of evaluating an execution trace for reinforcement learning is described (FIGS. 7 and 8). Finally, some examples of graphical user interfaces for accessing the disclosed techniques are described (FIGS. 9A-9E)

FIG. 1 is a functional diagram illustrating an embodiment of a system for teaching computer-use artificial intelligence agents from video demonstration. As will be apparent, other computer system architectures and configurations can be used to teach computer-use artificial intelligence agents from video demonstration. System 100, which includes various subsystems as described below, includes a client device 120 and a server 150.

The client device 120 includes a processor 124, a display 126, and one or more input devices 128. Some of the components may provide hardware functionalities while others provide software functionalities as shown by the dashed groupings of components. However, this is merely exemplary and not intended to be limiting. The client device is sometimes referred to as the "target system," because the disclosed techniques may be applied on the target system.

The processor 124 (also referred to as a central processing unit (CPU)) includes at least one microprocessor subsystem. For example, processor 124 can be implemented by a single-chip processor or by multiple processors. In some embodiments, processor 124 is a general purpose digital processor that controls the operation of the client device 120. Using instructions retrieved from memory, the processor 124 controls the reception and manipulation of input data, and the output and display of data on output devices (e.g., display 126).

Although not shown, processor 124 may be coupled bi-directionally with a memory, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 124. Also as is well known in the art, primary storage typically includes basic operating instructions, program code, data, and objects used by the processor 124 to perform its functions (e.g., programmed instructions). For example, memory can include any suitable computer-readable storage media, described below, depending on whether, for example, data access needs to be bi-directional or uni-directional. For example, processor 124 can also directly and very rapidly retrieve and store frequently needed data in a cache memory (not shown).

The process may be coupled either bi-directionally (read/write) or uni-directionally (read only) to a removable mass storage device that provides additional data storage capacity for the client device 120. For example, storage can also include computer-readable media such as magnetic tape, flash memory, PC-CARDS, portable mass storage devices, holographic storage devices, and other storage devices. A fixed mass storage can also, for example, provide additional data storage capacity. The most common example of mass storage is a hard disk drive. Mass storages generally store additional programming instructions, data, and the like that typically are not in active use by the processor 124. It will be appreciated that the information retained within mass storage can be incorporated, if needed, in standard fashion as part of memory (e.g., RAM) as virtual memory.

A bus (not shown) may provide processor 124 access to storage subsystems and other subsystems and devices. The bus may be implemented by any interconnection scheme serving to link the subsystems. As shown, subsystems can include a display (e.g., a monitor) 126, a network interface, one or more input devices 128 such as a keyboard or a pointing device, as well as an auxiliary input/output device interface, a sound card, speakers, and other subsystems as needed. For example, the pointing device can be a mouse, stylus, track ball, or tablet, and is useful for interacting with a graphical user interface.

A network interface (not shown) allows processor 124 to be coupled to another computer, computer network, telecommunications network, or server such as the server 150 using a network connection. For example, through the network interface, the processor 124 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 124 can be used to connect the client device 120 to an external network and transfer data according to standard protocols. For example, various process embodiments disclosed herein can be executed on processor 124 in cooperation with application software 134, or can be performed across a network such as the Internet, intranet networks, or local area networks, in conjunction with a remote processor such as the task execution engine 152 or orchestrator 154 that shares a portion of the processing. Additional mass storage devices (not shown) can also be connected to processor 124 through the network interface.

Software may be installed on the client device 120. In this example, the client device 120 includes system software 132 and application software 134. System software refers to software that manages and controls computer hardware such as an operating system, utility software such as disk management or antivirus, firmware, device drivers, and the like. Application software refers to software that executes specific user-directed tasks such as word processing. In the example shown in FIG. 1, the disclosed teaching computer-use AI agents from video demonstration techniques are implemented by the components of the server 150 in cooperation with application software including an agent 136 and a console 138 as further described herein.

The console 138 enables a user to manage tasks, agents such as agent 136, and platform configurations. In various embodiments, the console is a Web-based application or is accessed via an application such as a browser. FIGS. 9A-9E show some examples of user interfaces associated with the console.

The agent 136 interacts with components of the client device such as system software 132 to execute actions such as those provided by orchestrator 154 or other components associated with the server 150. The agent may control the operating system and collect data/metadata such as images (screenshots), accessibility data, information related to OS processes, among other things. The agent may be configured to observe task completion by a user interacting with the client device 120 such as by collecting video (e.g., screenshots) and device input information (e.g., keystrokes or mouse clicks). By observing task completion, a (task) prompt may be automatically created according to the disclosed techniques, which alleviate the burden that users may feel from manually creating prompts. The agent may be deployed via a software package installed on the client device 120, other computing device, or a virtual machine. The agent may interact seamlessly with various operating systems and applications. In this example, there is a single agent running on the client device 120. However, one or more agents may be deployed on one or more workers/nodes such as in a distributed computing system.

The server 150 includes a task execution engine 152, a prompt creator 160, an orchestrator 154, a task library 156, and a task editor 158. The server may include components similar to the ones described with respect to client device 120 to enable the functionalities described with respect to the server's constituent components. For example, the task execution engine may be implemented by one or more processors or processing nodes.

The task execution engine 152 makes decisions related to minimizing rework. The task execution engine may include one or more machine learning models. For example, the task execution engine may use multimodal machine learning models to interpret various (including complex) scenarios and make informed and appropriate decisions. In various embodiments, the task execution engine is configured to perform one or more of the following, without limitation:

- multimodal processing of computer states for grounding of visual and textual information,
- creating prompts for machine learning model inference,
- predicting next actions for a given agent,
- providing explainability for actions and decisions,
- implementing guardrails for potential high-risk actions, and
- requesting and processing user input during task execution.

The orchestrator 154 (sometimes called a "broker") manages communications between components, ensuring secure and efficient operation. The orchestrator may manage an overall workflow of task execution. In various embodiments, the orchestrator coordinates communications between agent(s) 136, task execution engine 152, console 138, and users of the client device 120. The orchestrator may manage interactions with third-party integrations and connectors such as those that trigger a task. As further described with respect to FIG. 2, the orchestrator may supervise task execution to ensure that user-defined configurations are followed. The orchestrator may handle task queuing, worker assignment, and execution flow.

The task editor 158 is configured to create, edit, and optimize tasks. For example, a user may interact with the task editor or aspects of the task editor may be automated or programmed. In various embodiments, the task editor has an interface accessible via console 138 to create, edit, and optimize tasks. The task editor may provide real-time or near real-time task prompt validation for completeness, clarity, and best practices. In various embodiments, the task editor includes a user input recommendation engine to suggest appropriate points for user interaction. The task editor is configured to translate high-level task descriptions into detailed step-by-step instructions. The task editor may ingest multimodal documentation (e.g., text and visual inputs) to create structured task prompts. The task editor may convert video recordings/screenshots (or, more generally, image data) of task execution into step-by-step natural language instructions. The task editor may offer a granularity adjustment slider to customize the level of detail in task instructions. The task editor may provide AI-assisted editing with suggestions based on historical performance data. The task editor may enhance task quality, reduce a learning curve, and increase flexibility in task definition. Therefore, the task editor streamlines the process of translating existing manual processes into automated tasks.

The task library 156 stores data such as tasks and processing systems. The task library may serve as a central repository for defined automation tasks. Task definitions, which may be created by users or automatically defined, may be stored in the task library. For example, the task library may include a searchable database of tasks for quick access and reuse.

In various embodiments, the task library enables tasks to be managed such as by providing version control for task definitions, categorization and tagging for easy task organization and retrieval, and sharing and access control mechanisms for collaborative task management. The task library may be integrated with the console 138 for task creation, editing, and management, examples of which are shown in FIG. 4 and FIGS. 9A-9E Although shown as a single storage in this example, the storage may be implemented by one or more storage devices.

Advantages of the task library include enabling/supporting standardization of common processes across one or more organizations, knowledge retention of automation workflows, rapid deployment of new automation tasks based on existing templates, analytics on task usage and performance across the enterprise, among other things.

In experiments and use cases, it has been observed that it can be tedious and technically challenging for users to manually create task prompts. The disclosed techniques include automatically generating prompts. For example, computer-use AI agents such as agent 136 may be taught from video demonstration, where video (and other associated device input such as mouse clicks and keyboard strokes) may be observed by the agent 136 and ingested by prompt creator 160 to create prompts. In some embodiments, prompt creator 160 includes and/or is used to execute/perform the processes described herein with respect to FIG. 3. An example of a prompt creator 160 is further described with respect to FIG. 2.

In various embodiments, one or more of the components shown in the server 150 may instead be provided on the client device 120 or otherwise be a part of the customer's infrastructure rather than being accessed externally. For example, the MLLM and/or other components of the task execution engine 152 may be provided within the customer's infrastructure for data privacy, security, or compliance reasons.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. Other computer architectures having different configurations of subsystems can also be utilized.

In various embodiments, a platform for minimizing rework including teaching computer-use AI agents from video demonstration is provided. The platform may include a software product deployed natively in an infrastructure (e.g., cloud or on-premises) associated with an enterprise or other user (sometimes referred to as the "customer"). For example, the platform includes the agent 136 and console 138, which are supported by task execution engine 152, orchestrator 154, task editor 158, task library 156, and prompt creator 160 as further described herein. The platform provides AI-driven process automation across enterprise operations.

The following figure shows more details of an exemplary prompt creator 160.

FIG. 2 is a functional diagram illustrating an embodiment of a distributed system for teaching computer-use artificial intelligence agents from video demonstration. Each of the components are like their counterparts in FIG. 1 unless otherwise described. For simplicity, some of the components of the server such as an orchestrator and task editor are not shown here.

In this example, the application software includes a raw inputs collector 240. The functionality of the raw inputs collector may also be included in agent 136. The raw inputs collector 240 is configured to collect raw inputs from the client device such as interactions between a user and a computer user interface. Raw inputs may include video information such as a screenshot of (at least a portion of) what is output on display 126, device input information from input devices 128 such as a mouse or keyboard, processor 124 information such as time stamps, audio input from input devices such as a microphone, among other things. The raw inputs collector 240 is sometimes referred to as a "video task recorder," because one of its functionalities is to record video associated with completing a task including screenshots and device inputs. For example, a video recording captured at a specified frame rate, e.g., 15 FPS. The device input information may include a key strokes file logging all GUI activity such as mouse movements, clicks, keyboard inputs, or the like. The device input information may include accessibility tree metadata from UI applications with which the user interacts. The task recording components (video information and device input information) may be combined in a package.

The raw inputs collector 240 can be installed on a virtual machine where a computer-use agent operates, ensuring that the recording environment matches the execution environment. This recording process creates a comprehensive package containing aligned time series data of user actions and corresponding video frames that can be processed as further described herein.

The server 150 includes a prompt creator 160. The prompt creator includes an action extraction and alignment engine 262, a prompt generator 264, and a prompt enhancer 266. The action extraction and alignment engine 262 (sometimes referred to as a "video recording package parser) is configured to parse a package created by raw inputs collector 240 to identify anchor actions. Anchor actions are those events that significantly affect the computer state, such as mouse clicks, "Enter" key presses, or other interaction events as further described herein. For example, the action extraction and alignment engine 262 processes and aligns all input streams using timestamps, filters relevant frames corresponding to significant GUI actions, pre-processes input events by grouping related actions, and/or outputs filtered frames and ground truth GUI actions.

The prompt generator 264 is configured to generate an initial task prompt that describes a computer workflow in natural language. The prompt generator may include or otherwise use a machine learning model to generate the prompt.

The prompt enhancer 266 is configured to perform reinforcement learning to optimize the prompts generated by generator 264. The prompt generator may include or otherwise use a machine learning model to determine that a prompt can be enhanced.

The prompt generator 264 and the prompt enhancing model 266 may be configured to perform reinforcement learning. Reinforcement learning, while not always necessary because the initial prompt may be correct, is helpful for improving the task based on execution because it identifies mistakes in an execution trace and corrects those mistakes. A mistake refers to a discrepancy between a task recording (e.g., a ground truth) and a task prompt generated by a machine learning model, as further described herein. An example of performing reinforcement learning is further described with respect to FIG. 7.

FIGS. 1 and 2 depict three groups of machine learning models: multimodal machine learning model(s) included in task execution engine 152, prompt generator 264, and prompt enhancing model 266. Each of these machine learning models may be implemented by a variety of artificial intelligence models. Any suitable machine learning model such as a model with multimodal inference capability may be used. Examples of machine learning models include: Multimodal Large Language Models (MLLM), Vision Language Models (VLM), Large Language Models (LLM), Large Vision Models (LVM), and the like. The one or more machine learning models may be continuously updated and fine-tuned for optimal performance in enterprise automation scenarios. Although depicted as being a part of the task execution engine in FIG. 1 (in-house), one or more machine learning models may instead be remote from the task execution engine and/or provided by third parties.

FIG. 3 is a flow diagram illustrating an embodiment of a process for teaching computer-use artificial intelligence agents from video demonstration. This process may be implemented on or by the system of FIG. 1 or FIG. 2.

In the example shown, the process begins by receiving a task recording including (i) video information that captures a multi-step interaction with a computer user interface and (ii) device input information associated with the multi-step interaction (300). The video information and the device input information may be received in any order, including at least partially simultaneously.

Examples of device input information include keystrokes and mouse inputs. As further described herein, the process may receive audio context and/or commentary. Referring briefly to FIG. 2, in various embodiments, a raw inputs collector 240 performs process mining of actions performed on a computer system and generates a prompt. The recorder captures, without limitation:

video frames of the computer screen at a specified frame rate, peripheral input events (e.g., mouse movements, clicks, keyboard inputs), timestamps for the captured data, and/or voice annotations providing context or explanations.

In various embodiments, user interaction with the peripherals, e.g., keyboard, mouse, other input devices, is captured. The user interaction may include multiple steps and is therefore referred to as a "multi-step interaction." All UI activity may be being recorded alongside the video feed from the user's actions from this virtual machine. The recording is included in or generates a zip file package that contains the video frames from what a user recorded on the computer. Every keystroke, mouse click, or the like generates a time series of events with a timestamp. A time series of events is recorded from the computer peripherals. For example, the events include each keystroke. One event is key down, another event is key up, etc. for a string. W down, W up, I down, I up, L down, L up corresponds to typing the word "will." As another example, every time the user touches or moves the mouse, the system tracks that: left click, right click, mouse wheel. Alternatively, keystrokes, clicks, or the like may be sampled to collect a representation of a user's interaction with the computer.

The time series data is aligned with the video time series in various embodiments. The alignment of the timestamps may be based on a known timestamp where the video started, a known timestamp where the video ended, and a known frame rate in the video, e.g., per minute. The time series of the events can be aligned with the frame rates that we have for the video to determine the preceding frame, which is how the user interface looked before a particular click, as well as the following frame, which is how the user interface looked after the particular click. The alignment may be important for determining the prompt as further described herein.

The process extracting a sequence of anchor actions from the video information using the device input information (302). In various embodiments, an anchor action includes at least one of: a mouse click, a keyboard input, or an interaction from the device input that alters a state of the computer user interface. The anchor action is referred to as an anchor because the timestamp is relevant and it is useful for filtering the frames. An anchor action means that the immediately preceding frame and the immediately following frame may be useful.

The process processes the task recording (sometimes referred to as a "recording package") received at 300 by identifying "anchor actions," which include events that significantly affect the computer state, such as mouse clicks, Enter key presses, or other interaction events. These anchor actions define the beginning and ending of something that will affect the computer state. The process uses these anchor actions to segment the video timeline into meaningful chunks. Extracting the sequence of anchor actions from the video information using the device input information may include aligning based on timestamps associated with the device input information with the video information to extract those frames of the video information that correspond to actions that a user performs on the computer user interface as further described herein. An example of a process for extracting an anchor action is further described with respect to FIG. 5.

The process obtains a preceding frame and a following frame from the video information adjacent to the anchor action for each anchor action in at least a subset of the sequence of anchor actions (304). Various approaches to filter the frames may be used. Suppose a video recording has 60 FPS. A vision language model is typically incapable of handling this many frames. Thus, a representative preceding frame and representative following frame are identified to reduce the number of frames provided to the vision language model. Typically, on the order of a dozen frames/images are determined.

A simple example of an anchor action is a click. The frame before the click and the frame after the click are captured. With these frames, an image diff on the screenshots that are similar and redundant may be performed. The process filters the ones that are different between the frames that are interpolated with that action. The click may be used to split similar frames in chunks.

An anchor frame captures actions that a user performed on a computer such as user interactions with a screen such as mouse click or typing on a keyboard. If a video playing on the screen and the user is not actively doing anything, then these are not anchor actions. The task identifying anchor actions is facilitated by extra channels of data such as mouse and keyboard inputs. The video, keyboard, and mouse can be aligned to define heuristics. For example, when there is a click, double-click, or scroll and a user starts typing, then the frame before that action and the frame after that action are good candidate frames for feeding into the prompt generator model.

Another approach is using a computer vision model where all the frames are fed to the model and the threshold is obtained on differences between frames. This identifies all the unique frames from the video. The threshold includes pixels that change between sequences of frames and can be tuned based on desired sensitivity. Sometimes the action is a mouse move, sometimes there is a dynamic web interface.

The process generates, by a prompt generator, a prompt using the anchor action (306). An example of a prompt generator is 264 of FIG. 2. The prompt may include a task prompt in natural language that describes the multi-step interaction based on the sequence of anchor actions and corresponding obtained preceding frames and following frames. The task prompt may include instructions executable by a computer-use agent to replicate the multi-step interaction.

The generated prompt is sometimes referred to as an "initial task prompt" or "initial prompt" because it can be enhanced or otherwise modified. In various embodiments, the process may use a plurality or sequence of anchor actions to generate the prompt. Using the plurality of anchor actions (sometimes referred to as the "processed action sequence"), the process generates an initial task prompt that describes the computer workflow in natural language.

In various embodiments, the prompt is generated including by:

- translating a sequence of anchor actions including the anchor action into at least one natural language instruction,
- incorporating any transcribed voice annotations as contextual guidance (e.g., responsive to a determination that audio associated with the sequence of anchor actions is available, creating contextual guidance for the machine learning model using the audio), and/or
- formatting the prompt to be intelligible to the machine learning model (e.g., maintaining the style and format compatible with the platform's prompt requirements and/or structuring the prompt to match established design patterns for the platform).

In other words, in various embodiments, generating the prompt using the sequence of anchor actions includes: responsive to a determination that audio associated with the sequence of anchor actions is available, including text associated with the audio as complementary contextual information for the prompt generator to translate the sequence of anchor actions into a sequence of natural language instructions included in the task prompt; and formatting the prompt to be intelligible to the prompt generator.

In various embodiments, prompt generation uses an AI model that is provided with a comprehensive system input containing context about what constitutes a good task prompt. This includes examples for few-shot learning of effective prompts and a list of available actions that can be prompted in the system. The model is then given a sequence of relevant frames and corresponding actions to generate a natural language description that follows the established format and design patterns of the platform.

Audio is not necessary because a simple task does not need implicit knowledge. However, for other tasks, audio commentary may be helpful. There is implicit knowledge on why a user is navigating a user interface of an application in a particular way that may not be obvious from merely observing interaction with the user interface but could be explained via narration. When considered along with video information and/or device input information, audio may offer additional insight into why a task is being performed a particular way.

Comprehensive audio may include explanation for all of the options, such as having the user record a first scenario selecting "in the cloud" and a second scenario selecting "locally" and explaining, for each scenario, the reasoning for selecting that option. The explanations may be provided as context to a large language model to improve the LLM's decision-making.

The information (e.g., rule or policy) learned from the audio is encoded in a variable and used in the task prompt. Suppose a ML model is being trained via context learning, specifically, few-shot learning, to perform new tasks using examples or instructions. The examples, referred to as reference tasks, include inputs and outputs. Reference tasks are considered high quality if they effectively teach the model and typically have good language, formatting styles, and demonstrations of how to perform a task.

For example, a task includes confirming that a screen with a particular condition is fully loaded before continuing. The model will learn to wait for a page to load even when it is slow to load (subject to a specifiable or pre-defined timeout).

There are tasks in which the implicit knowledge is encoded directly in the prompt. There are also tasks in which the implicit knowledge is encoded in a variable, such as a text variable. The model may refer to the text variable determine that it is a rule and encode the variable directly in the code such as, "If you see this, then do that." Or, if it is a policy that is longer, the model may determine, "Follow the guidelines on the variable instructions," and create the variable instructions with all the instructions on the variables including formatting and styling organization.

As a first example, suppose there is a drop-down menu with options or performing an action locally or in the cloud. By capturing audio input, the user can explain why they selected the cloud and not local. More generally, the user demonstrating the task can explain why they are making a particular decision or a choice on the user interface.

As another example, if a user is performing UI actions and encounters a dropdown with shipping company options (USPS, UPS, FedEx, DHL) and chooses DHL, they might say, "For a European customer, I'm going to use DHL." The system captures this voice input, transcribes it, and integrates that logic into the prompt. This captures implicit knowledge that might not be apparent from just watching the actions.

As yet another example, suppose there is an invoice entry for a bank and the person who is doing that very tedious work explained that she would look at the address of the supplier that sent the invoice and she will pick the closest branch to that address and assign those two together even if the branch is not specified in the invoice.

Conventional techniques typically do not use audio or do not use audio in combination with video information and/or device input information. Audio may be especially helpful for specialized industries, regulated industries, or legacy applications. For example, there is a potential to accumulate a lot of deep siloed enterprise data that is not publicly available. In some experimental settings, demonstrators have been observed to type input on mainframes (once common in the seventies or eighties) or on in-house applications completely custom with very convoluted UIs that might require fine-tuning.

In various embodiments, generating the task prompt in natural language includes translating each anchor action in the sequence of anchor actions into a corresponding natural language instruction, and concatenating the corresponding natural language instructions to form a structured task description.

The process executes, by a machine learning model, the prompt to obtain an execution trace including a sequence of predicted actions (308). A machine learning model such as one included or otherwise task execution engine 152 of FIG. 2 may be trained to receive one or more anchor actions (e.g., a natural language input) and output an execution trace.

This is sometimes referred to as a first pass by the machine learning model, because depending on the output of the machine learning model, additional passes may be performed. For example, if a node or interaction is deemed incorrect, then the prompt may be enhanced as follows and provided to the machine learning model in a subsequent pass. Sometimes, 310 and 312 do not need to be performed because the first pass produces a sufficient prompt that can be used as a task prompt. One example is if the generated prompt yields machine learning model output that matches ground truth actions extracted from the received task recording.

The process compares the sequence of predicted actions with the sequence of anchor actions to identify whether there is at least one discrepancy between an action of the sequence of predicted actions and an action of the sequence of anchor actions (310). The sequence of anchor actions are sometimes referred to as ground truth actions. As further described with respect to FIG. 7 and FIG. 8, examples of divergences include differences between a predicted action and an action of the anchor actions including an order of predicted actions in the subset of predicted actions being different from an order actions in the sequence of anchor actions.

If there is no discrepancy between an action of the sequence of predicted actions and an action of the sequence of anchor actions, the process proceeds to 316. In other words, responsive to identifying that there is no discrepancy between the action of the sequence of predicted actions and the action of the sequence of anchor actions, the process outputs the generated prompt. The generated prompt does not need to be enhanced to achieve an identical end state of the computer user interface included in the task recording. However, a benefit of evaluating whether there are discrepancies is that the generated prompt is validated.

Otherwise, if there is at least one discrepancy between an action of the sequence of predicted actions and an action of the sequence of anchor actions the process proceeds to 316. The process obtains an enhanced prompt by iteratively enhancing the prompt until there is no discrepancy between the sequence of predicted actions and the sequence of anchor actions (314). The enhancement is sometimes referred to as "reinforcement learning" or a "meta-prompting reinforcement learning loop." In various embodiments, a meta-prompting reinforcement learning loop optimizes the generated prompts. Conventional techniques typically lack such a reinforcement learning loop and therefore typically do not perform as well. The disclosed meta-prompting reinforcement learning loop ensures that when the prompt is executed by an AI agent, it reliably reproduces the actions demonstrated in the original recording. An example of a process for iteratively enhancing the prompt is further described with respect to FIG. 7.

In various embodiments, the enhancement may benefit from additional video input and the process may request additional input or otherwise invite a human to participate in a human-in-the-loop process. The system also incorporates human-in-the-loop mechanisms to handle edge cases and improve robustness:

- Assistance Recording: When an agent encounters difficulties during execution, it can request human assistance. The system records the human's intervention actions and can use these recordings to suggest improvements to the prompt.
- Voice Annotation: During the original recording, users can provide voice explanations that are transcribed and incorporated into the prompt, capturing implicit knowledge or decision criteria.
- Prompt Editing: After automatic generation, users can manually edit the prompt or record additional demonstrations for specific steps.
- Interactive Prompt Generation: Rather than generating the entire task prompt at once, users can record and generate prompts step by step, allowing for more control and targeted improvements.

When a computer-use agent runs into a challenge during execution, it can ask for human help to unblock it or provide guidance. The system records this human intervention and can suggest changes to the prompt based on it. This allows the system to handle edge cases that appear even years after deployment, continuously improving the automation. For example, the task recording obtained at 300 such as the video information may be underspecified, and a human is invited to provide a new demonstration by recording (re-recording) at least a subset of the video information obtained at 300.

In various embodiments, the process determines that the video information is underspecified, requests additional input associated with the video information, and extracts the anchor action using the video information and the additional input. When an agent runs into a challenge, it can ask a human for help such as unburdening it, unblocking it, instructing it, or approving the next steps. The human in the loop assistance to the agent can be recorded, e.g., a task recording is created when a human demonstrates how to resolve an issue, which may also be helpful for auditing purposes. Changes to a task prompt may be suggested based on the human input. Guardrails or additional exception handling steps may be embedded into an existing prompt, for example. Updates to an existing prompt to handle for a new edge case that appears after deployment may be suggested.

The process outputting at least one of: the generated prompt and the enhanced prompt (316). In various embodiments, executing the enhanced prompt replicates the multi-step interaction with a fidelity sufficient to achieve an identical end state of the computer user interface included in the task recording. The enhanced prompt may be output to a console such as console 138 for display to a user. An example of a graphical user interface displaying the enhanced prompt is shown in the following figure. In some cases, what is displayed in the graphical user interface is the prompt generated at 306, e.g., if no enhanced prompt is obtained or needed because the initial prompt is sufficiently good.

As described herein, the disclosed techniques include a console (e.g., console 138) providing functionality for managing tasks, workers, integrations, and viewing task execution metrics. In various embodiments, the console is implemented as a sophisticated web-based portal for creating, configuring, and managing automated tasks. This interface enables users to define complex workflows without requiring programming skills or special domain knowledge. The following figures show some example user interfaces associated with the console, more specifically, with a task editor.

FIG. 4 is a diagram illustrating an example of a graphical user interface for displaying a task prompt associated with a task to create a new user in an active directory (AD). The task prompt 502 may be automatically generated according to the disclosed techniques such as by performing the process of FIG. 3.

The interface may support various functions including workflow definition, input and output configuration, trigger mechanisms, and version control. Clearly defined sections for different aspects of task configuration are presented in a clean, intuitive interface. Visual cues and informative labels guide users through the task creation process, reducing the learning curve for new users. In this example, information associated with the task may be displayed such as the workflow prompt 502, inputs, and summary 506. Assistance may be provided to the user to create the task prompt according to the disclosed techniques.

The UI shown here may be displayed via console 138 of FIG. 1, e.g., via a Webpage in a browser. The menu at the top allows a user to navigate between aspects of the disclosed system such as tasks, runs, workers, team, and logs. Currently, a page associated with "tasks" is displayed. A task may have an associated task prompt (or simply "prompt"), input variables, output variables, triggers, tags, and metadata.

A prompt refers to a detailed, step-by-step description of the process in natural language. A prompt is sometimes referred to as a "workflow prompt," "a task definition," or "a task description" because the prompt specifies the steps comprising execution of a task, in various embodiments. A user may define a task prompt by inputting at least a portion of the description of the process. The prompt may guide a task execution engine such as 152 of FIG. 1 (and, in some instances, more specifically the machine learning model) in executing the task as further described herein. In the example shown here, the prompt includes steps for running a virus scan.

Information associated with a task for adding a new user to an AD may be displayed. The prompt section 502 includes steps to add a new user to an active delivery within a Windows® system. In this example prompt 502, there are input variables and output variables, which are represented by the gray bubbles within the prompt. The system allows for the definition of various input parameters, each of which may have a specified data type (e.g., String). Examples of input fields for user management tasks include orgUnit, Department, firstName, lastName, and userLogonName. Users can define expected outputs from the task execution, such as new_user_logon, enabling the capture of specific information generated during the automation process. The interface provides an extensible input/output system, allowing users to add custom parameters as needed for each task. Dynamic variable placeholders (e.g., "inputs.orgUnit") can be incorporated into the workflow description, allowing for flexible task execution with variable inputs. In this example, "inputs.orgUnit" is an input variable, the value of which may be determined by looking up the variable such as a key-value pair.

Figure 5:
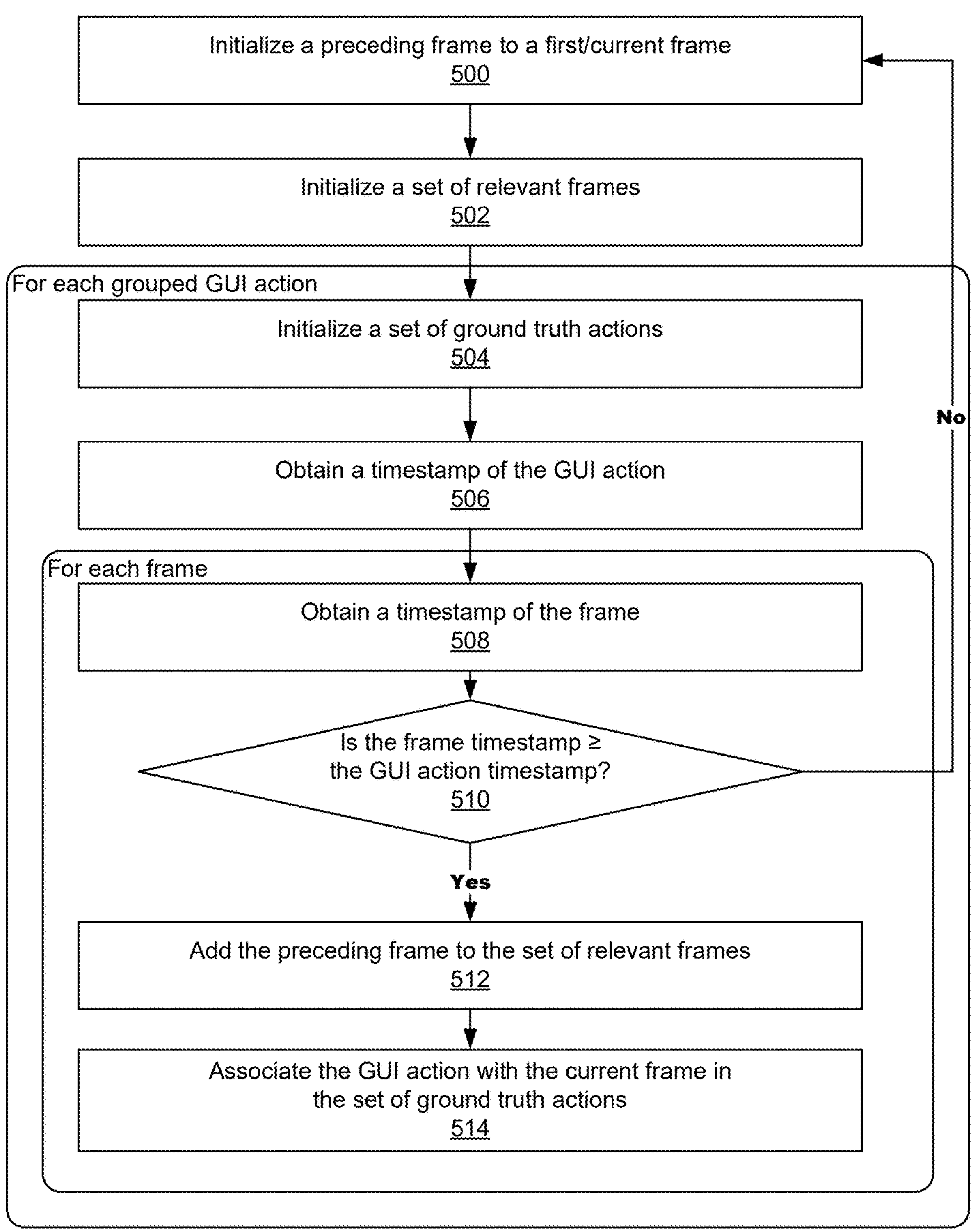
FIG. 5 is a flow diagram illustrating an embodiment of a process for extracting actions and aligning actions.

FIG. 5 is a flow diagram illustrating an embodiment of a process for extracting actions and aligning actions. This process may be implemented on or by the system of FIG. 1 or FIG. 2 such as by the action extraction and alignment engine 262. The process may be performed as part of another process such as 302 and 304 of FIG. 3. In various embodiments, this process then aligns all data streams (video frames, accessibility metadata, and input events).

In this example, the process begins by initializing the preceding frame to a current frame (500) and initializing a set of relevant frames (502).

For each grouped graphical user interface (GUI) action of at least a subset of GUI actions, the process initializes a set of ground truth actions (504), obtains a timestamp of the GUI action (506), and for each frame of at least a subset of frames, the process obtains a timestamp of the frame (508). Responsive to a determination that the timestamp of the frame is equal to or greater than the timestamp of the GUI action (510), the process adds the preceding frame to the set of relevant frames (512) and associates the GUI action with the current frame in the set of ground truth actions (514). Once the strings, spaces, enters, and clicks are identified, the frames are aligned with these events. The events serve as anchors, and all frames between anchors are compressed into single frames representing the state before and after an action. This results in a structured sequence of previous state, action, final state. In various embodiments, this structured sequence contains all necessary information to generate or validate prompts.

In various embodiments, the time series data (device input, e.g., from the mouse and the keyboard) can be pre-processed. For example, each keystroke is one event. Consolidating events is more efficient for processing because there are fewer objects/information to process. Heuristics are used to combine multiple events into a single master event. For example, typing F-I-L-E is combined into a single event "FILE." The first timestamp and the timestamp of the last key press are identified and used to find the corresponding frames. Similarly, mouse moves can be consolidated. The stream from the mouse is similar to a video and captured continuously at a given rate. Thus, moving the mouse from the bottom to the top of the screen may correspond to 100 or 200 events. These may be ground into a single action, which is the mouse move to the final coordinates.

An action may be made up of a group of events. An action is a click mouse movement and typing a string on a keyboard. Every key press, it depends if it's a combo key. Other manners of action extraction and alignment are possible. For example, computer vision techniques may be used. When processing a click, for example, the system captures the frame before the click and the frame after the click. The system can then perform an image diff on the screenshots to filter out similar and redundant frames, keeping only those that show differences associated with the action.

The system creates a stream of frames that looks very similar until a click occurs, followed by another series of frames that also look similar. The click may be used to split the time series into chunks. Image threshold comparison is used to compare pixels and filter out redundant frames automatically.

By examining keystrokes and mouse clicks with their timestamps, the system identifies anchor actions like pressing enter, ending typing keyboard, etc. The system compresses this data and looks at every sequence until a space, tab, enter, or escape is pressed, obtaining strings and detecting combo keys with 100% accuracy.

All the GUI actions are logged individually in a metadata file, with mouse buttons and keyboard events separated into "Up" and "Down" types. For instance, when a left mouse button is pressed, first the "Down" event is recorded. Then, when the mouse button is released, the "Up" event is logged, signifying that a single left click was performed. A pre-processing step groups these "Down" and "Up" actions together, and mouse movements are reduced to the starting position and ending position. For mouse movement events, the end position is considered to be the position immediately before any mouse button or keyboard event.

In a final pre-processing step, the system groups all mouse move events with mouse button and/or keyboard events. For instance, when there is a mouse movement followed by a mouse click, these two are grouped together. The same happens when a mouse movement, followed by a mouse click and keyboard typing, occurs since all of these actions are related. All mouse movement events are always grouped with another type of action, never alone.

An example of action extraction and alignment will now be explained with the aid of FIGS. 6A-6D. These graphical user interfaces are examples of video frames from a task recording to change a user password. Video frames are aligned with device input time series data such as the mouse input and keyboard inputs. Potential anchor actions are identified. If there are differences, then an anchor action is identified.

Figure 6A:
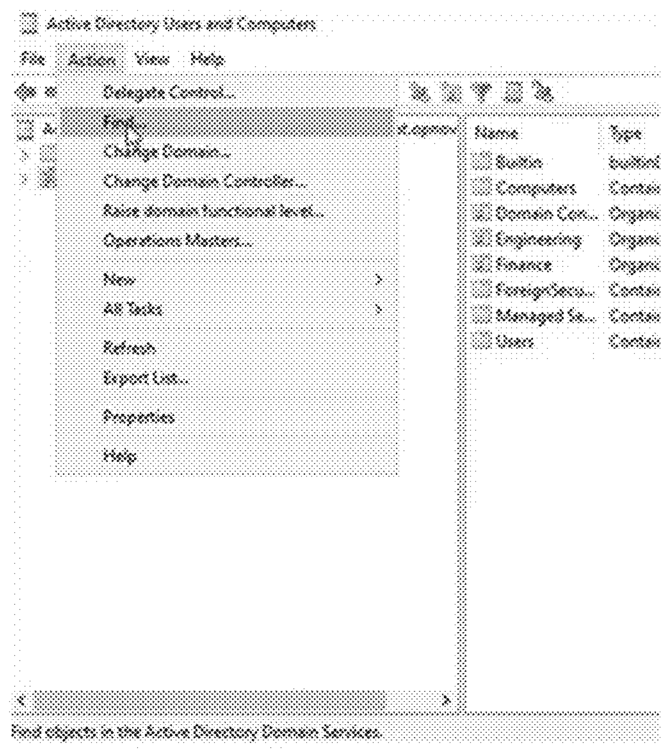
FIG. 6A is a diagram illustrating an example of a preceding frame for a first anchor action.

FIG. 6A is a diagram illustrating an example of a preceding frame for a first anchor action. In this example, the video frame is a state of a GUI prior to the first anchor action, which is left click "Action." The user then left clicks "Find" from the drop down menu, which is another anchor action.

Figure 6B:
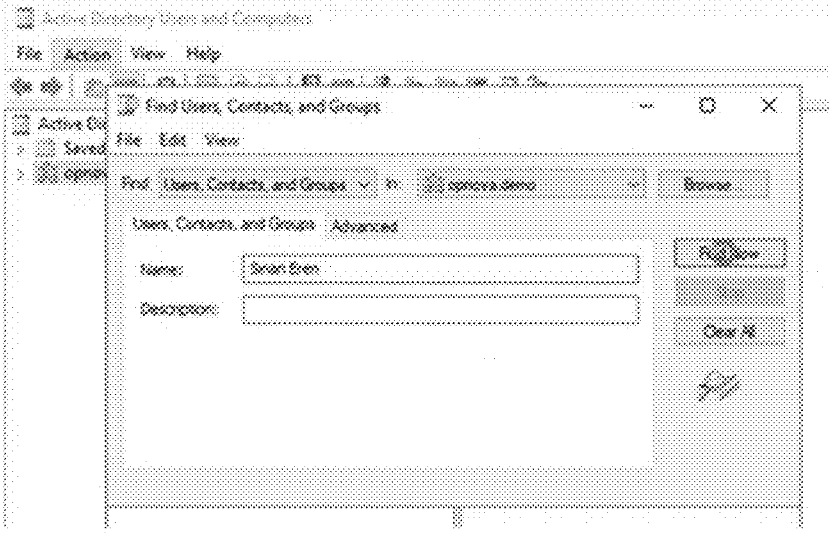
FIG. 6B is a diagram illustrating an example of a following frame for a first anchor action.

FIG. 6B is a diagram illustrating an example of a following frame for a first anchor action. In this example, the video frame is a state of a GUI after the anchor action "Left click 'Action'." This frame may be followed by another anchor action "Left click 'Find Now'."

Figures 6C, 6D:
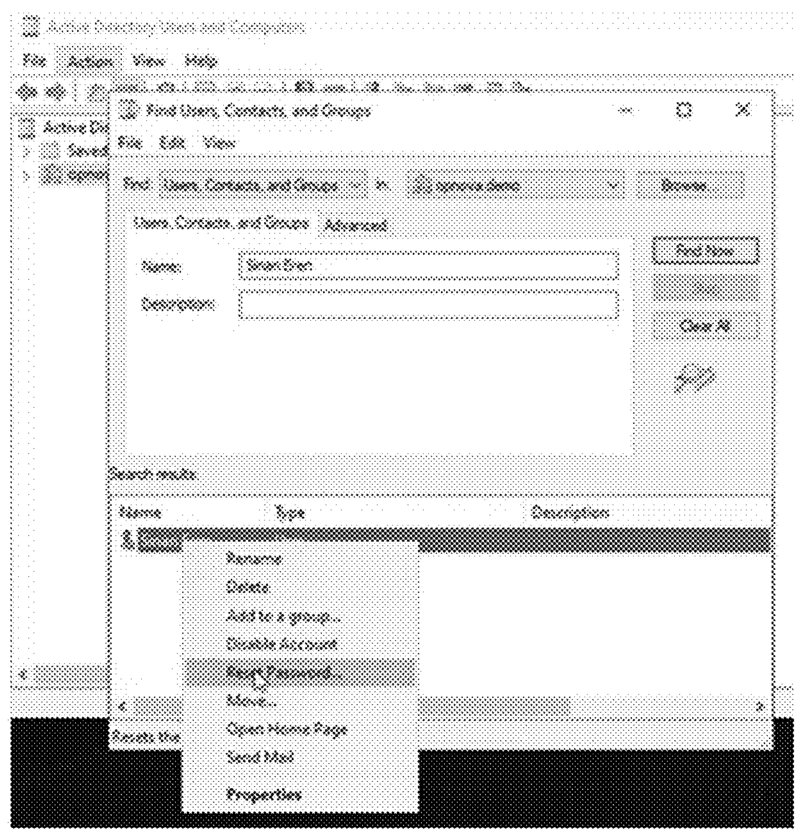
FIG. 6C is a diagram illustrating an example of a preceding frame for a second anchor action.
FIG. 6D is a diagram illustrating an example of a following frame for a second anchor action.

FIG. 6C is a diagram illustrating an example of a preceding frame for a second anchor action. In this example, the video frame is a state of a GUI after the anchor action "Type 'Sinan Eren'." 'Sinan Eren" may be a variable such as <inputs.firstName> <inputs.lastName>.

FIG. 6D is a diagram illustrating an example of a following frame for a second anchor action. In this example, the video frame is a state of a GUI after the anchor action "Right click "Sinan Eren" in the search results section." This frame may be followed by other anchor actions such as "'Reset Password' in drop-down menu," "auto-generate a secure password in 'New Password' field," "copy and paste the generated password in 'Confirm Password' field," "Left click 'OK'."

FIG. 7 is a flow diagram illustrating an embodiment of a process for enhancing a machine learning model output to obtain an enhanced prompt. This process may be implemented on or by the system of FIG. 1 or FIG. 2 such as by prompt enhancer 266 in cooperation with prompt generator 264. The process may be performed as part of another process such as 314 of FIG. 3.

This process is sometimes referred to as a meta-prompting (reinforcement learning) loop, which is based on the insight that because the system is learning to describe the actions a user performed on the computer, and the user's actions have been collected, this can be used to verify and improve the automatically generated prompt of 306. Since this is not an open-ended task, the task can be verified by comparing where the user clicked in the task recording when executing the task with what the agent 136 does given the generated prompt. Reinforcement learning can be used to refine the prompt until the worker (agent) 136 is clicking exactly as the user did in the task recording.

In various embodiments, prior to performing the process or as a pre-processing step, the filtered frames of the task recording are organized into logical steps. The organization can be done either manually or automatically, for example:

- Manual Organization: A user defines which frames are combined together to form a step. With n frames, there are $2^{(n-1)}$ possible ways to organize them. For example, with 8 frames, the user might group them as:
  - Option A: Step 1 (frames 1-3), Step 2 (frames 4-5), Step 3 (frames 6-8)
  - Option B: Step 1 (frames 1-2), Step 2 (frames 3-5), Step 3 (frames 6-7), Step 4 (frame 8)
- Automatic Organization: Each frame is considered an individual step, with the subsequent frame added as a confirmation that the first action was performed correctly. With 8 frames, this would create 8 steps, each with 2 actions (the relevant frame and the next frame as confirmation).

For each step, the system organizes the corresponding ground truth actions that will be used for validation in the reinforcement loop.

In this example, the process begins by identifying a subset of predicted actions of the sequence of predicted actions that diverges from the sequence of anchor actions (700). The sequence of anchor actions is sometimes referred to as ground truth actions. Examples of ground truth actions include, without limitation: precise coordinates of mouse clicks, exact sequences of keyboard inputs, timing and order of all actions, and/or UI elements interacted with (e.g., identified through accessibility metadata). The process automatically translates what happened with the keyboard and mouse to actions in a defined list of actions, e.g., keyboard, string action, keyboard type text, mouse move, mouse click. An example of an action extraction process is further described with respect to FIG. 5. An example of video frames included in a task recording is further described with respect to FIGS. 6A-6D.

The process generates, by a prompt enhancer, feedback describing the divergence between the subset of predicted actions and the sequence of anchor actions (702). The feedback may include the identification of the subset of predictions actions of the sequence of predicted actions that diverges from the sequence of anchor actions and guidance for how to correct the divergence.

For example, the process executes a prompt generated at 306 (by prompt generator 264) with an AI inference model to produce the GUI action(s). The at least one graphical user interface (GUI) action is determined by the machine learning model included in the prompt enhancer using the generated prompt as input. In other words, the AI inference model takes a prompt and outputs the GUI action(s), which can be thought of as a simulation of what happens when a prompt is executed by a worker agent 136.

The feedback may be based on the divergence or mismatch between the at least one GUI action with the at least one ground truth action. The identified divergence between the subset of predicted actions of the sequence of predicted actions and the sequence of anchor actions may include an order of predicted actions in the subset of predicted actions being different from an order actions in the sequence of anchor actions. That is, a mismatch may include at least one of: the at least one GUI action being different than the at least one ground truth action and an order of the at least one GUI action being different from an order of the at least one ground truth action The process compares the inferred GUI action(s) to the ground truth action(s). The comparison checks that actions are the same and in the same order. For example, if the ground truth is a mouse move followed by a click, there is a mismatch if a click is followed by a mouse move. If the actions match, the prompt is considered good and is accepted for use/output at 312.

The process provides the generated feedback to the prompt generator to obtain an updated task prompt (704). If the actions are wrong, in the wrong order, or if the model response contains more than the required actions, the system provides feedback to a prompt generator such as prompt generator 264, explaining the errors that were made. After providing feedback, the system obtains a response from the prompt generator, creating an improved step prompt.

The process re-executes the updated task prompt to update the sequence of predicted actions (706). For example, task execution engine 152 (re)executes the updated task prompt to update the sequence of predicted actions. This process may be repeated until there is no discrepancy between the sequence of predicted actions and the sequence of anchor actions.

In various embodiments, the process combines prompts generated by the prompt enhancer into the enhanced prompt. After going through all steps and producing prompts that correctly trigger the ground truth GUI actions, the system concatenates all the generated prompts into a single structured task prompt that is ready to automate the process recorded in the video.

The process of FIG. 7 can also be thought of as, prior to enhancing the machine learning output at 310, evaluating a degree of match between the machine learning model output and at least one ground truth action obtained from the received task recording, where the machine learning model output is enhanced to obtain an enhanced prompt in response to a determination that the degree of match exceeds a threshold. The evaluation of the degree match can be performed by evaluating an execution trace to identify mistakes. This is further explained with the aid of the following figure.

FIG. 8 is a conceptual diagram illustrating enhancing a machine learning model output to obtain an enhanced prompt. Each of the prompt generator 264, prompt enhancer 266, and agent 136 are like their counterparts in FIGS. 1 and 2 unless otherwise described.

This meta-prompting loop enables progressive optimization of the prompt through multiple iterations. Each iteration aims to reduce the non-determinism inherent in natural language instructions while maintaining the benefits of using natural language as the vehicle for defining agent behaviors.

In various embodiments, the system implements a relaxation on the ground truth test when comparing actions. For example, if the coordinates where the human clicked are somewhere in a button, clicking slightly to the right can still be valid. An exact match to the coordinates from the video recording may be too strict. The system may accept clicks that are a little to the left or right of the original. Alternatively, since the system captures accessibility metadata, it knows which bounding box was clicked and could accept any click within the entire bounding box as matching the ground truth.

A benefit to using natural language as a vehicle to define what the model should do in production addresses the risk that natural language may not be specific enough. The run-through validation forces the prompt to be more specific where needed, giving confidence that if the prompt is run 100 times, it will click on the right elements 100 times, making it ready for production use.

Beginning at 802, a task recording is provided to prompt generator 264. The prompt generator generates 804 an initial prompt, and the prompt is fed 806 to the agent 136 (e.g., workflow engine or task execution engine).

The agent generates 808 an execution trace (here, Execution Trace 1). The execution trace shows a sequence of frames (nodes). Given a task prompt, a computer controlled agent executes a task according to the task prompt. For example, a machine learning model receives as input video information (e.g., screenshots) and device input information (e.g., keystrokes and mouse clicks, and optionally audio) and produces outputs (e.g., a simulation of performing the task, or more specifically, simulation of task outputs). The agent outputs an action. The action can be evaluated to see if it matches the action for the first screenshot of a ground truth.

The system evaluates the execution trace. For example, the execution trace is provided 810 to prompt enhancer 266 for evaluation 812. The system evaluates whether the execution trace matches the task recording. The execution trace can be thought of as a working state diagram or a state machine, where the states are different possible user interfaces. The current execution trace (reflecting the machine learning model's understanding) likely contains some errors. The execution trace structure may include screenshots, text, and various variables. The ground truth may be derived from the task recording and used to identify a mistake in a particular state or node of the execution trace. A mistake is determined using a screenshot from the sequence and the expected output action for that screenshot by comparing the expected output action for the screenshot and the output of the machine learning model.

In this example, a discrepancy (or mismatch) is noted between the Ground Truth and Execution Trace 1, namely frame 3 differs as noted by the circle 852. The initial prompt and result (e.g., "answer") of the evaluation also gets (dashed arrow) the task recording and the initial (or previous) prompt. Because of the discrepancy, the prompt enhancer generates 814, feedback (e.g., a prompt) to correct Execution Trace 1. In various embodiments, the enhancement does not require additional video input. The prompt may include a description of what was wrong, and what needs to be changed to the prompt generator 264. For example, the feedback may describe which step failed, what should be clicked, and/or instructions to update/correct the prompt. For example, the feedback may explain that the execution trace was correct until screenshot 3. Screenshot 3 does not match the ground truth because the menu coordinate is wrong, so candidate extraction should be corrected.

As another example, an execution trace analysis may include:

Ground Truth Action:

Action Type: Right Click

Target: Tree node "Engineering" in left navigation panel

Coordinates: Within bounding box (45, 234) to (156, 252)

UI Element: Tree View item with accessibility name "Engineering"

Agent Predicted Action:

Action Type: Right Click

Target: Empty area in right details pane

Coordinates: (520, 340)

UI Element: ListView (empty selection)

(Feedback) Discrepancy Type: Incorrect click target-same action type but wrong UI element Analysis: The current prompt says "Navigate to the organizational unit" but does not specify that the right-click action to create a new user must be performed ON the organizational unit folder in the tree view, not in the details pane. This is also an example of under-specification because the current prompt did not include sufficient specification.

Prompt Modification:

The instruction for creating a new user needs to explicitly specify:

1. The right-click must target the organizational unit folder in the LEFT navigation tree
2. The context menu for "New>User" appears from the tree node, not the details pane Please revise the prompt to include explicit guidance that the user creation action is initiated by right-clicking the target organizational unit in the navigation tree panel.

The prompt and answer 816 instructs the prompt generator 264 to generate a new prompt and re-evaluates from the beginning until the evaluation is good (e.g., there is no mismatch). For example, the prompt generator 264 generates 818, an enhanced prompt that is provided 820 to the agent 136 for execution. The agent generates 822 an execution trace (here, Execution Trace 2). The system evaluates the execution trace. For example, the execution trace is provided 810 to prompt enhancer 266 for evaluation 812. The system evaluates whether the execution trace matches the task recording. In this example, there is no discrepancy between the Ground Truth and Execution Trace 2 in the evaluation 824.

As another example, a number (e.g., six) of screenshots is used as a sequence and the instruction is, "Based on these six screenshots, generate the prompt." The system prompt includes the context of the examples, the actions that can be generated, and examples of in-shot learning of other prompts to capture the design pattern of the prompt.

An example of a prompt is "Click on recycle bin on desktop, right click, you need to select empty recycle bin, otherwise it will be turned down. Start." The ground truth action is a mouse move with an absolute coordinate. And then, the mouse button is the left button and what it did was a down/up click. Validating the prompt using the ground truth action makes the prompt more consistent and/or more specific. In this example, there is no under-specification, which increases the determinism of the model. The more attuned and specific the prompt, the less non-determinism obtained from these models. There may be some randomization in these models, but a goal may be to reduce that non-determinism to the maximum.

The system provides a wizard interface that allows users to create new steps, record videos for those steps, and incorporate the automatically generated prompts into their workflow. After recording a step, the system processes the video and presents the generated prompt to the user for review and acceptance. Users can re-record specific portions of a task if they're not satisfied with the results, rather than having to re-record the entire workflow. The console provides a user interface where users can create new steps, record videos, and manage prompts. After recording, the system processes the video and generates a prompt that users can review, edit, and accept before it becomes part of the task definition. Users can select which worker agent should perform the recording, ensuring that the recording environment matches the execution environment.

The following figures show some examples of how the disclosed techniques for automatically generating a prompt can be accessed from a console 138.

Figure 9A:
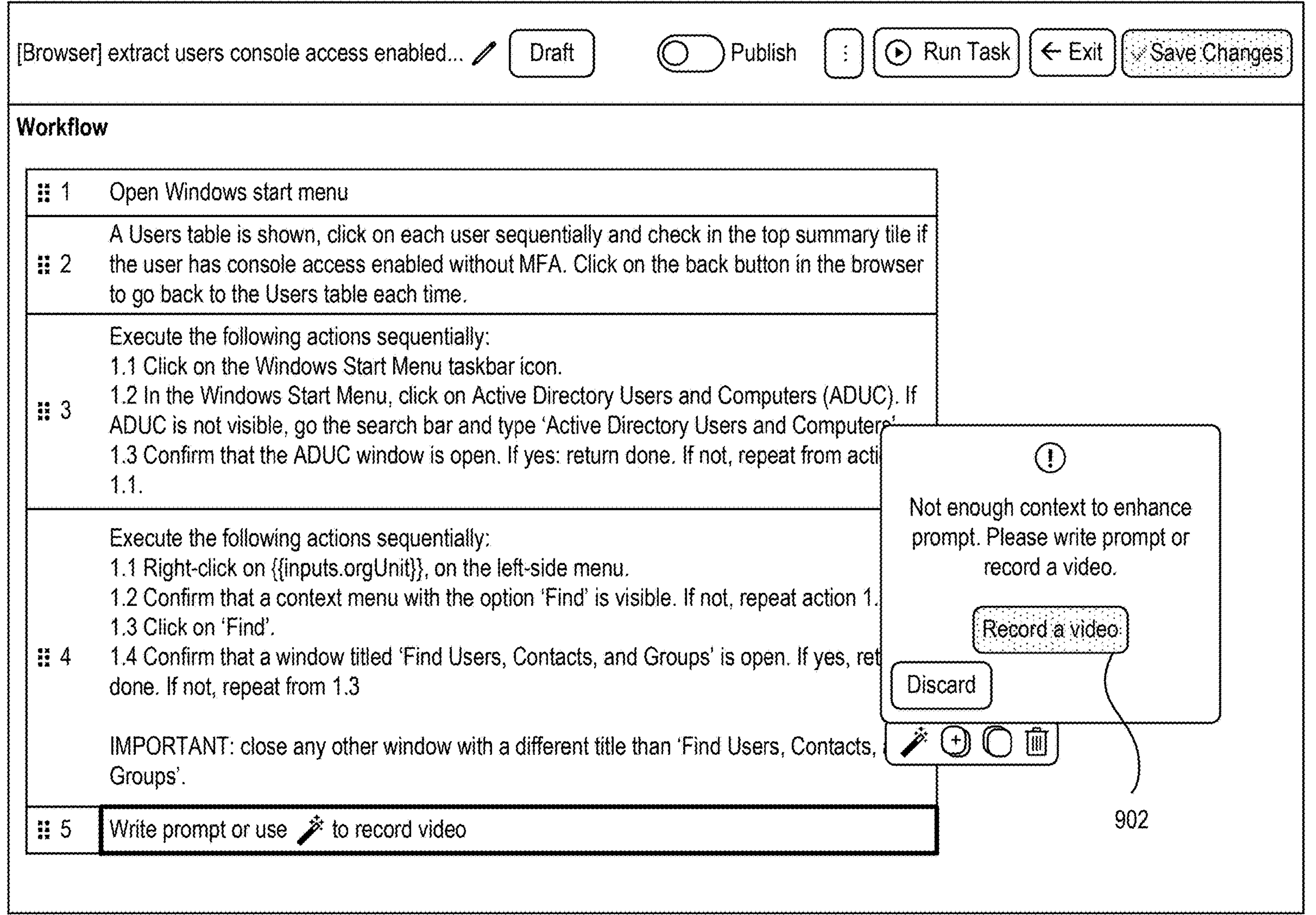
FIG. 9A is a diagram illustrating an example of triggering a process for teaching computer-use artificial intelligence (AI) agents from video demonstration.

FIG. 9A is a diagram illustrating an example of triggering a process for teaching computer-use artificial intelligence (AI) agents from video demonstration. In this example, a user may click the wizard/magic wand icon to automatically generate a prompt in lieu of or as a supplement to writing a prompt. For example, a user may click the "Record a video" button 902 to make a task recording. This may cause the next GUI to be displayed.

Figure 9B:
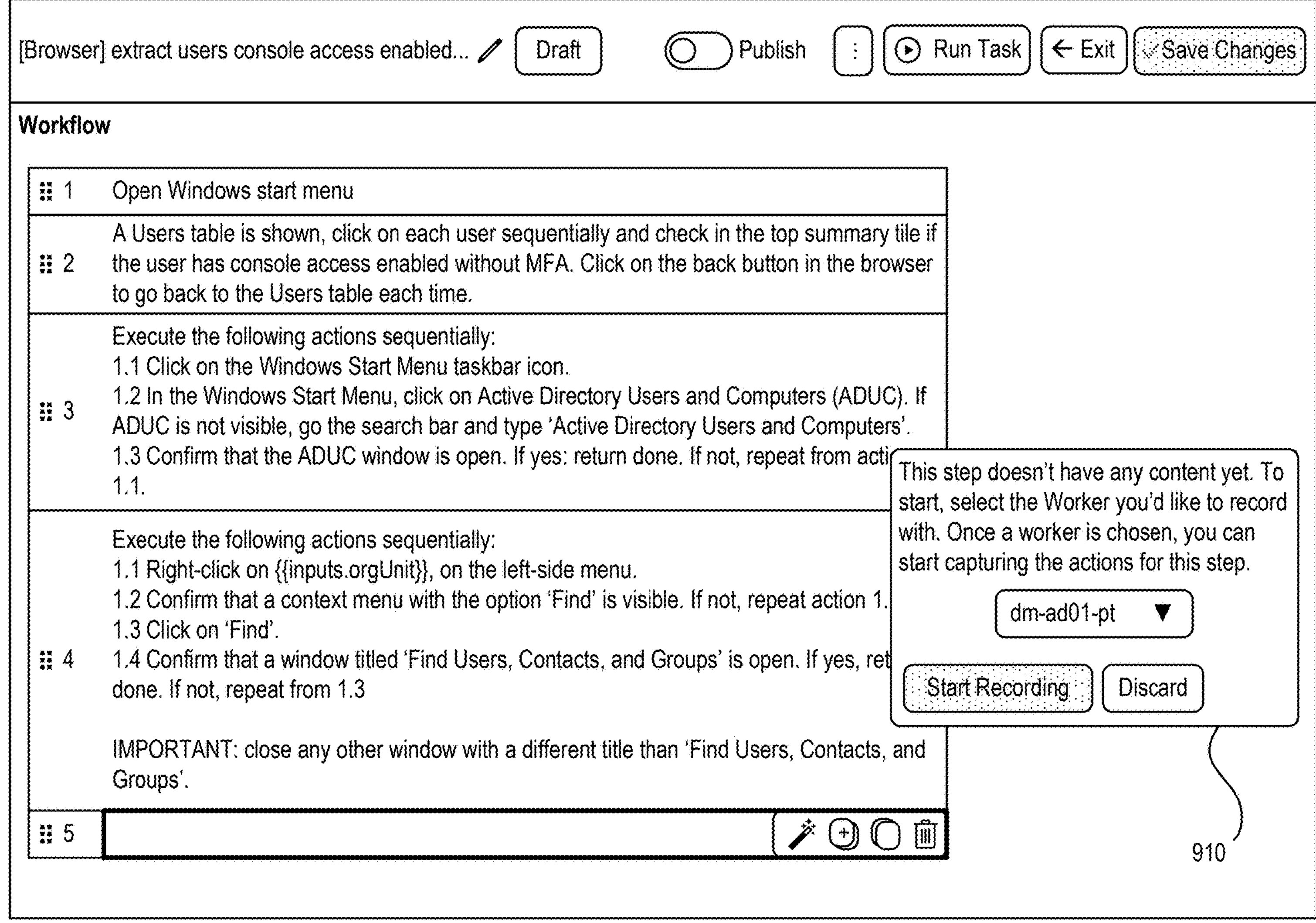
FIG. 9B is a diagram illustrating an example of indicating an agent for providing video demonstration for teaching computer-use artificial intelligence (AI) agents.

FIG. 9B is a diagram illustrating an example of indicating an agent for providing video demonstration for teaching computer-use artificial intelligence (AI) agents. Window 910 allows a user to select a particular agent, e.g., agent 136 of FIG. 1, to capture a task recording. Here, the user selects an agent identified by unique identifier dm-ad01-pt from a drop-down menu to capture a task recording.

Upon starting the recording, the corresponding agent/virtual machine may be displayed. For example, there will be a pop-up, "waiting for recording," or a user clicks record. The UI and the name of the task and the step to be recorded may be displayed. The agent receives the recording request such as "You are about to start recording the step five of the task, create user in active directory." A demonstrator clicks start to create the task recording. When you hit stop, the video or a thumbnail of the video is displayed. The recording may be made as described herein, and a user may accept the recording by submitting the recording and returning to the console for further tuning, if desired.

Alternatively, the recording can be more integrated with the UI shown here. For example, the worker agent can be accessed in the console shown here instead of going to a separate virtual machine. In various embodiments, from the management interface, the system can remote into the worker space. For example, once a recording is initiated, a pop-up window is displayed with an embedded remote desktop session into the platform, rather than switching to another application. Similarly, when human-in-the-loop assistance is requested, e.g., via email, clicking a link in the email causes a console to be loaded with a remote desktop session for the demonstrator to take over and do the action as further described herein.

In various embodiments, to make the user experience fully embedded, a demonstrator could record step by step each desired step. The text is accepted and the demonstrator clicks on a new step, and then decides whether to write the prompt or record the video. For example, there is a first step involving interaction with a UI, but then the next step is reading a file or reading a PDF file. The demonstrator could demonstrate the first step and simply write the prompt on reading the PDF file for the second step. What is supported is recording a small part of a workflow. For example, a user experience includes clicking a record, editing something, performing prompt enhancement with the prompt wizard, etc.

There may be context in the workflows that might not be captured by the video recording. The context may be some implicit knowledge and/or context, e.g., why a demonstrator selected a dropdown. As described herein, the context could be captured via voice recording.

In the example of FIG. 9A, a user can click the magic wand (wizard) button. In this example there is no textual prompt to improve (the box next to step 5 is blank) and the user is choosing to record a video. Alternatively, there could be an existing text prompt that is supplemented by a video to improve the prompt. For example, a prompt can be enhanced as shown in the following figure.

Figure 9C:
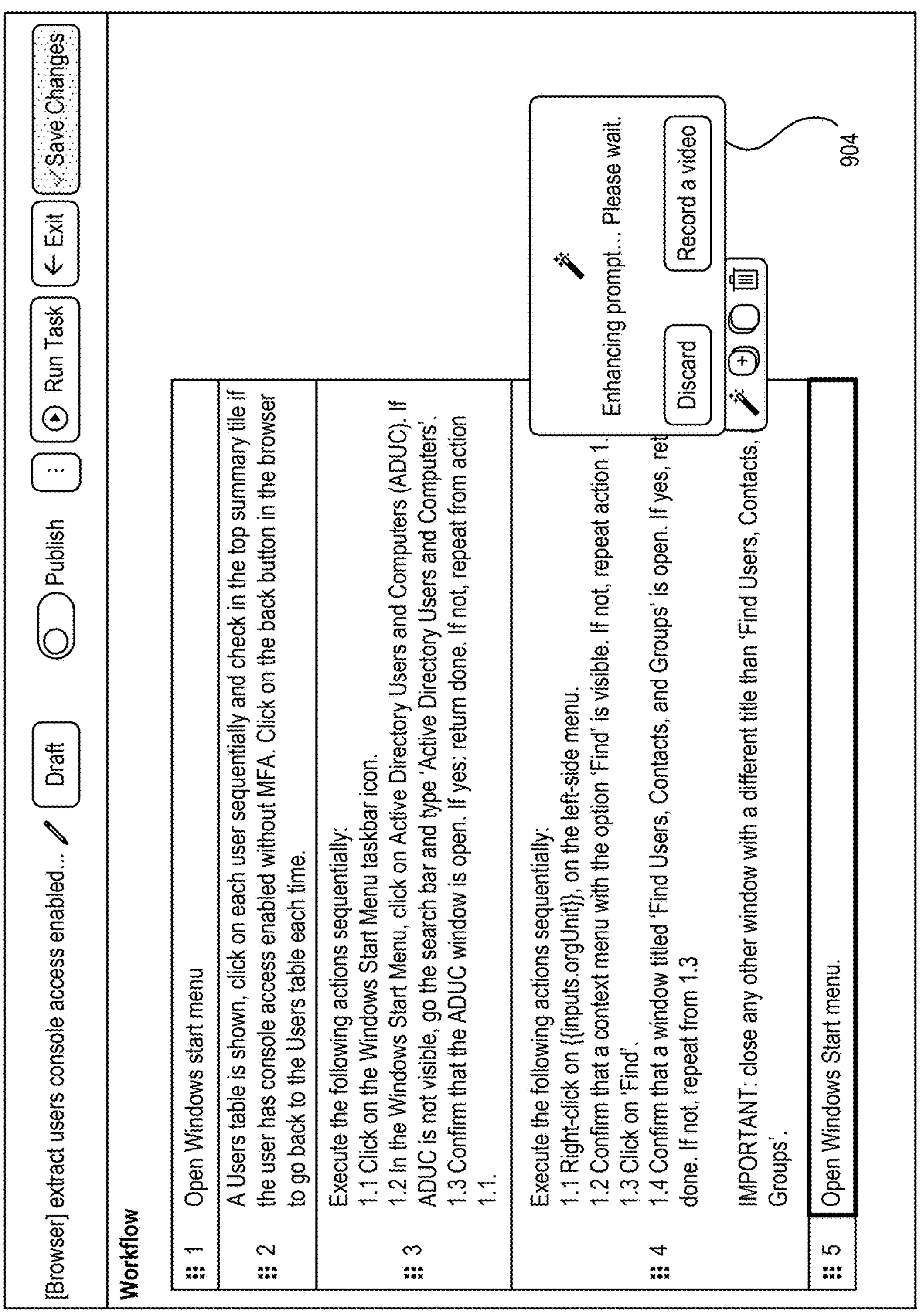
FIG. 9C is a diagram illustrating an example of a state of a graphical user interface upon triggering a process for teaching computer-use artificial intelligence (AI) agents from video demonstration.

FIG. 9C is a diagram illustrating an example of a state of a graphical user interface upon triggering a process for teaching computer-use artificial intelligence (AI) agents from video demonstration. This shows a different way to obtain an automatically generated task prompt. In this example, the suggested prompt is based on the user input in step 5, "Open Windows Start menu." Here, window 904 displays a message indicating that a prompt is being automatically generated. In various embodiments, an explanation is also displayed with the prompt. The process of FIG. 3 may be performed to generate the task prompt. This may cause the next GUI to be displayed.

Figure 9D:
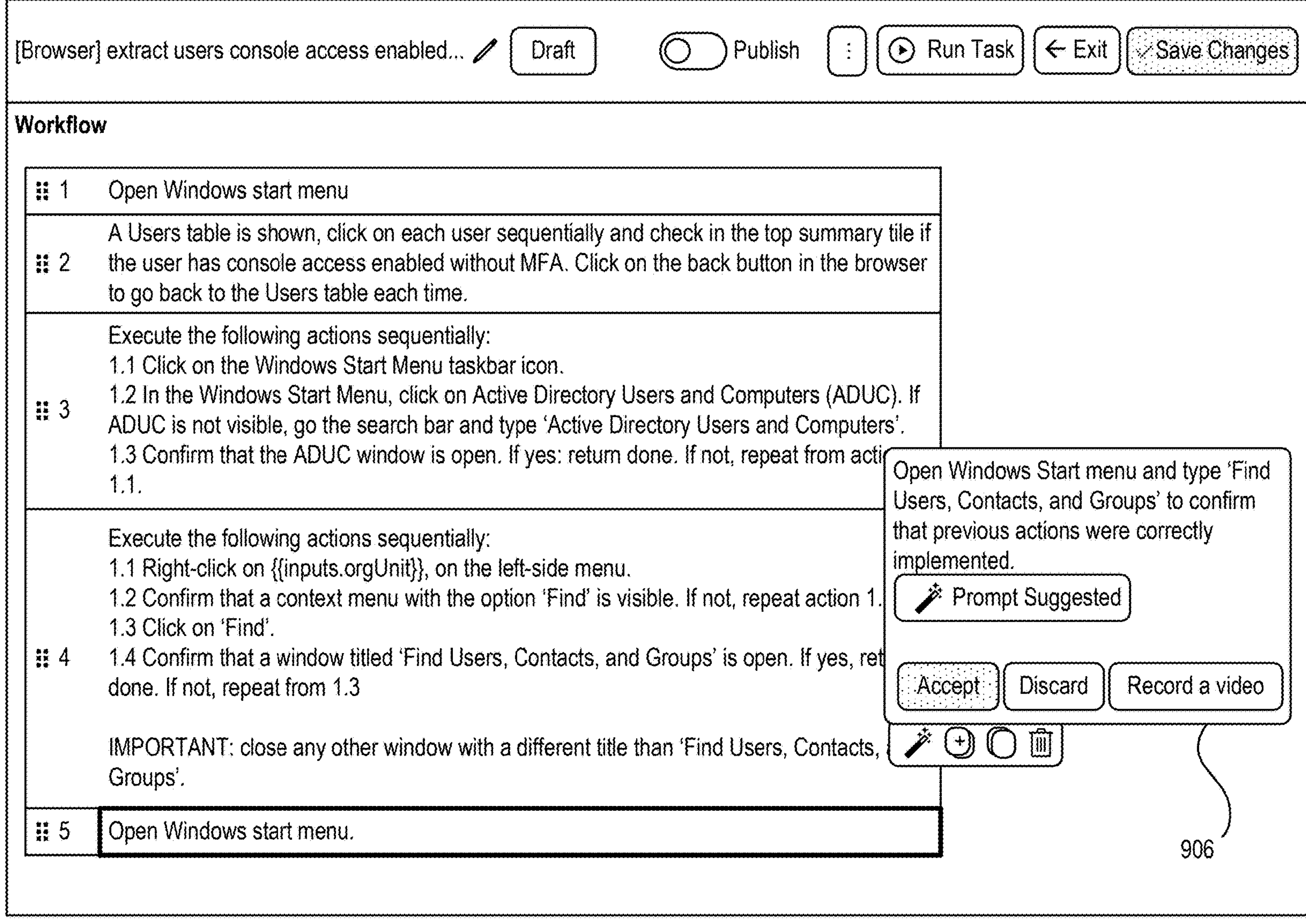
FIG. 9D is a diagram illustrating an example of a state of a graphical user interface including an automatically generated task prompt.

FIG. 9D is a diagram illustrating an example of a state of a graphical user interface including an automatically generated task prompt. In this example, window 906 is populated with a suggested prompt. A user may accept, discard, or record additional video. Upon selecting "Accept," the next GUI may be displayed.

Figure 9E:
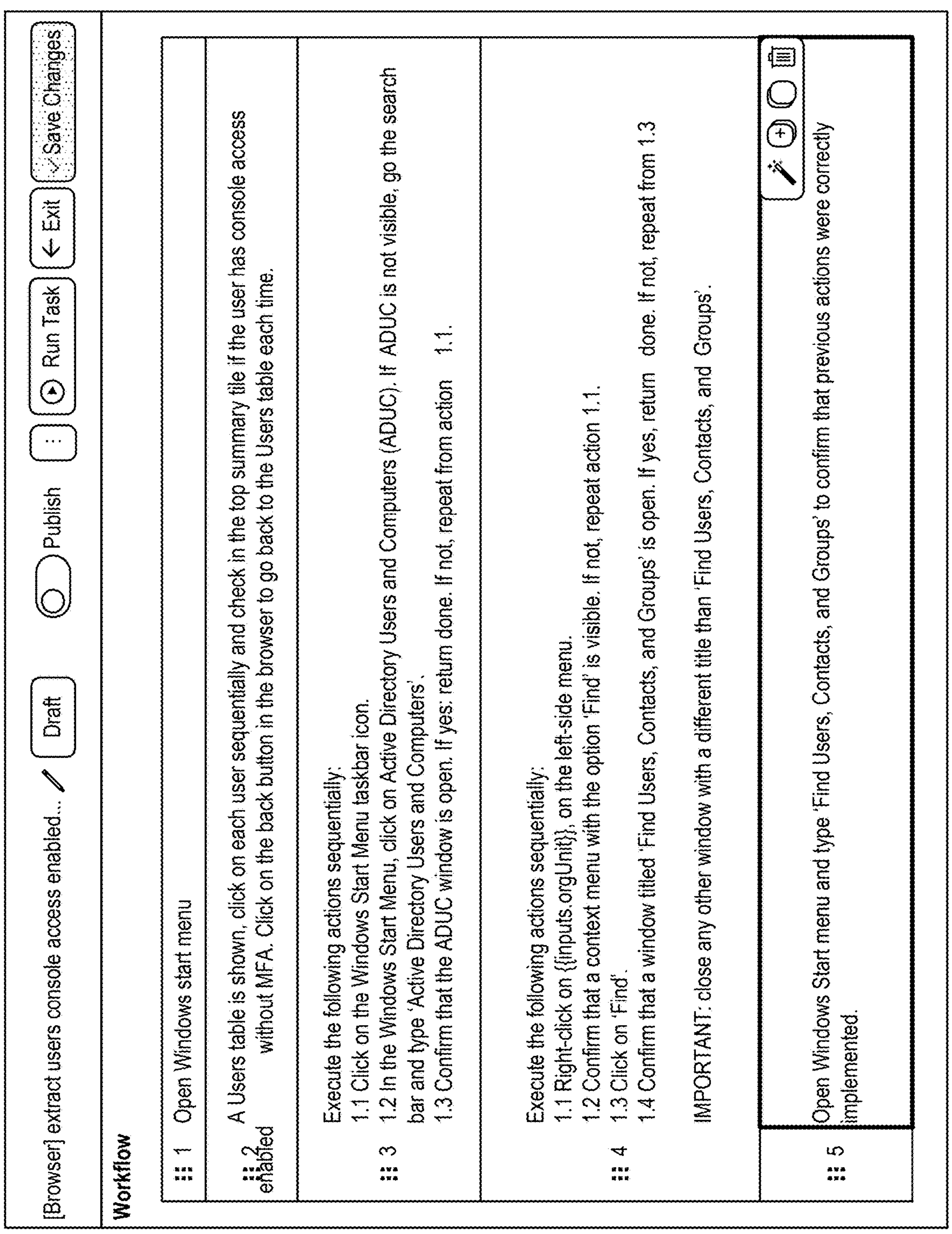
FIG. 9E is a diagram illustrating an example of a state of a graphical user interface including an accepted automatically generated task prompt.

FIG. 9E is a diagram illustrating an example of a state of a graphical user interface including an accepted automatically generated task prompt. Because the user accepted the suggested task prompt, the prompt gets incorporated into the workflow at step 5. The user may make further modifications using the menu on the top right, which includes a wizard/magic wand icon that can be selected to provide additional video recordings.

The disclosed techniques provide several advantages over conventional approaches:

- Reduced Development Time: Eliminates the need for specialized expertise in writing prompts by learning directly from demonstrations. The system automates the creation of complex prompts that would otherwise require a level four platform engineer or consultant to develop.
- Improved Accuracy: The meta-prompting reinforcement learning loop ensures that generated prompts reliably reproduce the intended actions. By iteratively refining prompts until they match ground truth actions with high precision, the system produces automations that behave consistently even in complex scenarios.
- Flexibility: The system can adapt to changes in UI elements or application behavior through its grounding in visual state rather than fixed coordinates. By utilizing accessibility metadata and visual context, the resulting prompts are more resilient to UI changes than traditional automation approaches.
- Knowledge Capture: Voice annotations and human interventions capture implicit knowledge that might be missed in traditional automation approaches. This enables the system to incorporate contextual decision-making and business logic that would be difficult to extract from actions alone.
- Continuous Improvement: The system can learn from edge cases and human interventions over time, progressively improving the robustness of task automation. By recording human assistance during execution challenges, the system can suggest improvements to handle previously unseen scenarios.
- Reduced Maintenance Burden: Traditional automation technologies often require significant maintenance when applications change. This system's approach of using natural language prompts that are visually grounded reduces the brittleness commonly associated with coordinate-based automation.
- Democratization of Automation: By removing the requirement for specialized programming knowledge, the system allows non-technical users to create sophisticated automations based on their demonstrated expertise in performing tasks.

The disclosed techniques include an interactive mode of being able to use different modalities, examples from demonstrations from the humans, inputs from voice comments, etc. that all adhere to a style. Users may struggle with creating prompts that adhere to a style and the disclosed techniques facilitate or automate the creation of task prompts that adhere to the style.

The disclosed techniques decrease the friction of having to type out everything, and specialized domain knowledge. Instead, a task recording that includes a video demonstration with device input and, optionally, voice narration may integrate all that information to create a prompt that enables a task to be performed as desired.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a task recording including (i) video information that captures a multi-step interaction with a computer user interface and (ii) device input information associated with the multi-step interaction;

extracting a sequence of anchor actions from the video information using the device input information;

for each anchor action in at least a subset of the sequence of anchor actions, obtaining a preceding frame and a following frame from the video information adjacent to the anchor action;

generating, by a prompt generator, a prompt, wherein:

the prompt includes a task prompt in natural language that describes the multi-step interaction based on the sequence of anchor actions and corresponding obtained preceding frames and following frames; and the task prompt includes instructions executable by a computer-use agent to replicate the multi-step interaction;

executing, by a machine learning model, the prompt to obtain an execution trace including a sequence of predicted actions;

comparing the sequence of predicted actions with the sequence of anchor actions to identify whether there is at least one discrepancy between an action of the sequence of predicted actions and an action of the sequence of anchor actions;

identifying that there is at least one discrepancy between the action of the sequence of predicted actions and the action of the sequence of anchor actions;

responsive to the identifying that there is at least one discrepancy between the action of the sequence of predicted actions and the action of the sequence of anchor actions, obtaining an enhanced prompt by iteratively enhancing the prompt until there is no discrepancy between the sequence of predicted actions and the sequence of anchor actions; and outputting at least one of: the generated prompt and the enhanced prompt.

2. The method of claim 1, wherein an anchor action of the sequence of anchor actions includes at least one of: a mouse click, a keyboard input, or an interaction from the device input information that alters a state of the computer user interface.

3. The method of claim 1, wherein the device input information includes at least one of: keystrokes and mouse movements.

4. The method of claim 1, wherein the prompt includes a task definition for execution by the computer-use agent.

5. The method of claim 1, wherein executing the enhanced prompt replicates the multi-step interaction with a fidelity sufficient to achieve an identical end state of the computer user interface included in the task recording.

6. The method of claim 1, wherein generating the prompt using the sequence of anchor actions includes:

responsive to a determination that audio associated with the sequence of anchor actions is available, including text associated with the audio as complementary contextual information for the prompt generator to translate the sequence of anchor actions into a sequence of natural language instructions included in the task prompt; and formatting the prompt to be intelligible to the prompt generator.

7. The method of claim 1, wherein generating the task prompt in natural language includes:

translating each anchor action in the sequence of anchor actions into a corresponding natural language instruction; and concatenating the corresponding natural language instructions to form a structured task description.

8. The method of claim 1, wherein iteratively enhancing the prompt includes:

identifying a subset of predicted actions of the sequence of predicted actions that diverges from the sequence of anchor actions;

generating, by a prompt enhancer, feedback describing the divergence between the subset of predicted actions and the sequence of anchor actions;

providing the generated feedback to the prompt generator to obtain an updated task prompt; and re-executing the updated task prompt to update the sequence of predicted actions.

9. The method of claim 8, wherein the feedback includes the identification of the subset of predicted actions of the sequence of predicted actions that diverges from the sequence of anchor actions and guidance for how to correct the divergence.

10. The method of claim 8, wherein the identified divergence between the subset of predicted actions of the sequence of predicted actions and the sequence of anchor actions includes an order of predicted actions in the subset of predicted actions being different from an order of actions in the sequence of anchor actions.

11. The method of claim 8, further comprising combining a plurality of prompts generated by the prompt enhancer into the enhanced prompt.

12. The method of claim 1, wherein extracting the sequence of anchor actions from the video information using the device input information includes aligning based on timestamps associated with the device input information with the video information to extract those frames of the video information that correspond to actions that a user performs on the computer user interface.

13. The method of claim 12, wherein the device input information is pre-processed to combine a plurality of keystrokes into a single grouped keystroke and the preceding frame and the following frame are identified based at least in part on a first timestamp associated with a first keystroke of the plurality of keystrokes and a last keystroke of the plurality of keystrokes.

14. The method of claim 1, wherein extracting the sequence of anchor actions from the video information using the device input information includes:

initializing the preceding frame to a current frame;

initializing a set of relevant frames; and for each grouped graphical user interface (GUI) action of at least a subset of GUI actions:

initializing a set of ground truth actions;

obtaining a timestamp of the GUI action; and for each frame of at least a subset of frames:

obtaining a timestamp of the frame; and responsive to a determination that the timestamp of the frame is equal to or greater than the timestamp of the GUI action:

adding the preceding frame to the set of relevant frames; and associating the GUI action with the current frame in the set of ground truth actions.

15. The method of claim 1, further comprising responsive to identifying that there is no discrepancy between the action of the sequence of predicted actions and the action of the sequence of anchor actions, outputting the generated prompt.

16. The method of claim 1, further comprising:

receiving audio including at least one of context and commentary explaining the captured multi-step interaction with the computer user interface;

determining at least one of: a rule and a policy based at least in part on the audio;

encoding the at least one of: a rule and a policy in a variable; and using the variable in the enhanced prompt.

17. The method of claim 16, wherein the audio includes an explanation of at least a portion of options in the computer user interface.

18. The method of claim 1, further comprising:

determining that the video information is underspecified;

requesting additional input associated with the video information; and extracting the sequence of anchor actions using the video information and the additional input.

19. The method of claim 1, wherein the prompt includes at least one variable.

20. The method of claim 19, wherein the at least one variable includes a type of variable in response to a determination that the at least one variable includes sensitive data.

21. The method of claim 1, wherein the method is performed in at least one of: a private cloud or on-premises.

22. A system, comprising:

a processor configured to:

receive a task recording including (i) video information that captures a multi-step interaction with a computer user interface and (ii) device input information associated with the multi-step interaction;

extract a sequence of anchor actions from the video information using the device input information;

for each anchor action in at least a subset of the sequence of anchor actions, obtain a preceding frame and a following frame from the video information adjacent to the anchor action;

generate, by a prompt generator, a prompt, wherein:

the prompt includes a task prompt in natural language that describes the multi-step interaction based on the sequence of anchor actions and corresponding obtained preceding frames and following frames; and the task prompt includes instructions executable by a computer-use agent to replicate the multi-step interaction;

execute, by a machine learning model, the prompt to obtain an execution trace including a sequence of predicted actions;

compare the sequence of predicted actions with the sequence of anchor actions to identify whether there is at least one discrepancy between an action of the sequence of predicted actions and an action of the sequence of anchor actions;

responsive to identifying that there is at least one discrepancy between the action of the sequence of predicted actions and the action of the sequence of anchor actions, obtain an enhanced prompt by iteratively enhancing the prompt until there is no discrepancy between the sequence of predicted actions and the sequence of anchor actions; and output at least one of: the generated prompt and the enhanced prompt; and a memory coupled to the processor and configured to provide the processor with instructions.

23. A computer program product embodied in a non-transitory computer readable medium and comprising computer instructions for:

receiving a task recording including (i) video information that captures a multi-step interaction with a computer user interface and (ii) device input information associated with the multi-step interaction;

extracting a sequence of anchor actions from the video information using the device input information;

for each anchor action in at least a subset of the sequence of anchor actions, obtaining a preceding frame and a following frame from the video information adjacent to the anchor action;

generating, by a prompt generator, a prompt, wherein:

the prompt includes a task prompt in natural language that describes the multi-step interaction based on the sequence of anchor actions and corresponding obtained preceding frames and following frames; and the task prompt includes instructions executable by a computer-use agent to replicate the multi-step interaction;

executing, by a machine learning model, the prompt to obtain an execution trace including a sequence of predicted actions;

comparing the sequence of predicted actions with the sequence of anchor actions to identify whether there is at least one discrepancy between an action of the sequence of predicted actions and an action of the sequence of anchor actions;

responsive to identifying that there is at least one discrepancy between the action of the sequence of predicted actions and the action of the sequence of anchor actions, obtaining an enhanced prompt by iteratively enhancing the prompt until there is no discrepancy between the sequence of predicted actions and the sequence of anchor actions; and outputting at least one of: the generated prompt and the enhanced prompt.

24. The system of claim 22, wherein an anchor action of the sequence of anchor actions includes at least one of: a mouse click, a keyboard input, or an interaction from the device input information that alters a state of the computer user interface.

25. The system of claim 22, wherein the device input information includes at least one of: keystrokes and mouse movements.

26. The system of claim 22, wherein the prompt includes a task definition for execution by the computer-use agent.

27. The system of claim 22, wherein executing the enhanced prompt replicates the multi-step interaction with a fidelity sufficient to achieve an identical end state of the computer user interface included in the task recording.

28. The system of claim 22, wherein generating the prompt includes:

responsive to a determination that audio associated with the sequence of anchor actions is available, including text associated with the audio as complementary contextual information for the prompt generator to translate the sequence of anchor actions into a sequence of natural language instructions included in the task prompt; and formatting the prompt to be intelligible to the prompt generator.

29. The system of claim 22, wherein generating the task prompt in natural language includes:

translating each anchor action in the sequence of anchor actions into a corresponding natural language instruction; and concatenating the corresponding natural language instructions to form a structured task description.

30. The system of claim 22, wherein iteratively enhancing the prompt includes:

identifying a subset of predicted actions of the sequence of predicted actions that diverges from the sequence of anchor actions;

generating, by a prompt enhancer, feedback describing the divergence between the subset of predicted actions and the sequence of anchor actions;

providing the generated feedback to the prompt generator to obtain an updated task prompt; and re-executing the updated task prompt to update the sequence of predicted actions.

31. The system of claim 30, wherein the feedback includes the identification of the subset of predicted actions of the sequence of predicted actions that diverges from the sequence of anchor actions and guidance for how to correct the divergence.

32. The system of claim 30, wherein the identified divergence between the subset of predicted actions of the sequence of predicted actions and the sequence of anchor actions includes an order of predicted actions in the subset of predicted actions being different from an order actions in the sequence of anchor actions.

33. The system of claim 30, wherein the processor is further configured to combine a plurality of prompts generated by the prompt enhancer into the enhanced prompt.

34. The system of claim 22, wherein extracting the sequence of anchor actions from the video information using the device input information includes aligning based on timestamps associated with the device input information with the video information to extract those frames of the video information that correspond to actions that a user performs on the computer user interface.

35. The system of claim 34, wherein the device input information is pre-processed to combine a plurality of keystrokes into a single grouped keystroke and the preceding frame and the following frame are identified based at least in part on a first timestamp associated with a first keystroke of the plurality of keystrokes and a last keystroke of the plurality of keystrokes.

36. The system of claim 22, wherein extracting the sequence of anchor actions from the video information using the device input information includes:

initializing the preceding frame to a current frame;

initializing a set of relevant frames; and for each grouped graphical user interface (GUI) action of at least a subset of GUI actions:

initializing a set of ground truth actions;

obtaining a timestamp of the GUI action; and for each frame of at least a subset of frames:

obtaining a timestamp of the frame; and responsive to a determination that the timestamp of the frame is equal to or greater than the timestamp of the GUI action:

adding the preceding frame to the set of relevant frames; and associating the GUI action with the current frame in the set of ground truth actions.

37. The system of claim 22, wherein the processor is further configured to, responsive to identifying that there is no discrepancy between the action of the sequence of predicted actions and the action of the sequence of anchor actions, output the generated prompt.

38. The system of claim 22, wherein the processor is further configured to:

receive audio including at least one of context and commentary explaining the captured multi-step interaction with the computer user interface;

determine at least one of: a rule and a policy based at least in part on the audio;

encode the at least one of: a rule and a policy in a variable; and use the variable in the enhanced prompt.

39. The system of claim 38, wherein the audio includes an explanation of at least a portion of options in the computer user interface.

40. The system of claim 22, wherein the processor is further configured to:

determine that the video information is underspecified;

request additional input associated with the video information; and extract the sequence of anchor actions using the video information and the additional input.

41. The system of claim 22, wherein the prompt includes at least one variable.

42. The system of claim 41, wherein the at least one variable includes a type of variable in response to a determination that the at least one variable includes sensitive data.

43. The system of claim 22, wherein the method is performed in at least one of: a private cloud or on-premises.

* * * * *